United States Patent
Satoyama et al.

(10) Patent No.: US 7,908,449 B2
(45) Date of Patent: *Mar. 15, 2011

(54) DATA REPLICATION IN A STORAGE SYSTEM

(75) Inventors: Ai Satoyama, Sagamihara (JP); Noboru Morishita, Yokohama (JP); Yasutomo Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/716,308

(22) Filed: Mar. 3, 2010

(65) Prior Publication Data

US 2010/0161900 A1 Jun. 24, 2010

Related U.S. Application Data

(63) Continuation of application No. 11/907,748, filed on Oct. 17, 2007, now Pat. No. 7,689,792, which is a continuation of application No. 10/879,471, filed on Jun. 30, 2004, now Pat. No. 7,302,535.

(30) Foreign Application Priority Data

Apr. 9, 2004 (JP) .................................. 2004-115693

(51) Int. Cl.
G06F 12/00 (2006.01)

(52) U.S. Cl. ........................................ 711/163; 711/165

(58) Field of Classification Search .................... 711/163
See application file for complete search history.

(56) References Cited

U.S. PATENT DOCUMENTS

| 4,785,415 A | 11/1988 | Kariquist ..................... 713/401 |
|---|---|---|
| 5,210,866 A | 5/1993 | Milligan et al. |
| 5,403,639 A | 4/1995 | Belsan et al. |
| 5,459,857 A | 10/1995 | Ludlam et al. |
| 6,073,209 A | 6/2000 | Bergsten |
| 6,073,218 A | 6/2000 | DeKoning et al. |
| 6,131,148 A | 10/2000 | West et al. |
| 6,341,341 B1 | 1/2002 | Grummon et al. ............ 711/162 |
| 6,567,774 B1 | 5/2003 | Lee et al. |
| 6,606,690 B2 | 8/2003 | Padovano |
| 6,618,794 B1 | 9/2003 | Sicola et al. |
| 6,728,849 B2 | 4/2004 | Kodama ........................ 711/162 |
| 6,820,180 B2 | 11/2004 | McBrearty et al. ........... 711/162 |
| 6,883,073 B2 | 4/2005 | Arakawa et al. |
| 6,922,763 B2 | 7/2005 | Suzuki et al. |
| 7,124,128 B2 | 10/2006 | Springer et al. |
| 7,240,238 B2 * | 7/2007 | Yanai et al. ....................... 714/7 |
| 7,302,535 B2 | 11/2007 | Satoyama et al. |

(Continued)

FOREIGN PATENT DOCUMENTS

EP 0656588 A2 6/1995

(Continued)

*Primary Examiner* — Hong Kim
*Assistant Examiner* — Ngoc V Dinh
(74) *Attorney, Agent, or Firm* — Brundidge & Stanger, P.C.

(57) ABSTRACT

For a storage system having plural control units to which plural disk devices are connected, in the method for creating replication in a volume of the disk devices connected to different control units, when receiving update I/O of a replication source during an initial copy for replication, the reflection of update to the replication destination is performed on an extension of the same I/O. When a pair is divided after the completion of copying, the update position is retained on the differential bitmap disposed in the individual control units, and the differential bitmap is merged to one of the control units at a time of resynchronization to perform copy processing.

14 Claims, 23 Drawing Sheets

U.S. PATENT DOCUMENTS

| | | |
|---|---|---|
| 2002/0013864 A1 | 1/2002 | Dandrea et al. .................. 710/6 |
| 2002/0124139 A1 | 9/2002 | Baek et al. |
| 2002/0129214 A1 | 9/2002 | Sarkar |
| 2002/0144070 A1 | 10/2002 | Watanabe et al. |
| 2002/0188626 A1 | 12/2002 | Tomita et al. |
| 2003/0051111 A1 | 3/2003 | Nakano et al. |
| 2003/0110362 A1 | 6/2003 | Shiozawa et al. |
| 2003/0131207 A1 | 7/2003 | Arakawa et al. |
| 2003/0204572 A1 | 10/2003 | Mannen et al. |
| 2004/0059958 A1 | 3/2004 | Umberger et al. ................ 714/5 |
| 2004/0085317 A1 | 5/2004 | Malik et al. .................. 345/440 |
| 2005/0120172 A1 | 6/2005 | Ozaki et al. |
| 2005/0125609 A1 | 6/2005 | Satoyama et al. |
| 2006/0005074 A1 | 1/2006 | Yanai et al. |
| 2008/0052480 A1 | 2/2008 | Satoyama et al. |
| 2009/0106515 A1 | 4/2009 | Arai et al. |

FOREIGN PATENT DOCUMENTS

| | | |
|---|---|---|
| EP | 1217523 | 6/2002 |
| JP | 07152491 | 6/1995 |
| JP | 07-210439 | 8/1995 |
| JP | 11212932 | 8/1999 |
| JP | 11242566 | 9/1999 |
| JP | 2000339104 | 12/2000 |
| JP | 200114112 | 1/2001 |
| JP | 2001-318833 | 11/2001 |
| JP | 2002007304 | 1/2002 |
| JP | 2002278704 | 9/2002 |
| JP | 2002297455 | 10/2002 |
| JP | 2003-131818 | 5/2003 |
| JP | 2003167684 | 6/2003 |
| JP | 2003216474 | 7/2003 |
| JP | 2003316616 | 11/2003 |

* cited by examiner

FIG.6A

| PAIR NUMBER | ORIGINAL VOLUME INFORMATION | COPY VOLUME INFORMATION | PAIR STATUS |
|---|---|---|---|
| 0 | 100 | 10 | Pair |
| 2 | 120 | 30 | Split |
| 4 | 140 | 69 | Split |
|   |   |   |   |

| PAIR NUMBER | ORIGINAL VOLUME INFORMATION | | COPY VOLUME INFORMATION | | PAIR STATUS |
|---|---|---|---|---|---|
|  | STORAGE CONTROL UNIT NUMBER | VOLUME NUMBER | STORAGE CONTROL UNIT NUMBER | VOLUME NUMBER |  |
| 1 | 1 | 100 | 2 | 120 | Pair |
| 3 | 1 | 130 | 3 | 260 | Pair |
|   |   |   |   |   |   |

| VOLUME NUMBER | ORIGINAL/ COPY | PAIR VOLUME INFORMATION | | VOLUME STATUS |
|---|---|---|---|---|
| | | STORAGE CONTROL UNIT NUMBER | VOLUME NUMBER | |
| 0 | ORIGINAL | 1 | 20 | IN USE |
| 0 | ORIGINAL | — | 158 | IN USE |
| 0 | ORIGINAL | 1 | 426 | IN USE |
| 1 | COPY | 3 | 3783 | IN USE |

PAIR IN THE SAME STORAGE CONTROL UNIT

PAIR IN DIFFERENT STORAGE CONTROL UNITS

PAIR IN SAME STORAGE CONTROL UNIT

PAIR IN DIFFERENT STORAGE CONTROL UNITS

US 7,908,449 B2

DATA REPLICATION IN A STORAGE SYSTEM

CROSS-REFERENCE TO RELATED APPLICATION

The present application is a continuation of application Ser. No. 11/907,748, filed Oct. 17, 2007 now U.S. Pat. No. 7,689, 792; which is a continuation of application Ser. No. 10/879, 471, filed Jun. 30, 2004, now U.S. Pat. No. 7,302,535, which claims priority from Japanese application JP 2004-115693 filed on Apr. 9, 2004, the content of which is hereby incorporated by reference into this application.

BACKGROUND OF THE INVENTION

The present invention relates to a storage system and a data replication method, and more particularly to a storage system comprising plural storage control units to which plural disk devices are connected, and a data replication method for creation of replication.

Recently, demands for the reduction of time necessary for processing to create replication (hereinafter referred to as the backup) of data stored in a storage device of a storage system possessed by corporations in another storage device are increasing. Such demands are backed by the reduction of time allocated to the backup processing because an amount of information possessed by the corporations is increasing and the time for backup is increasing while business hours of corporations are extended.

The prior art enabling to backup data stored in a storage device without stopping the daily jobs of the corporations includes, for example, snapshot technologies proposed as described in JP-A-7-210439 and JP-A-2001-318833. The snapshot is a function to copy a storage area possessed by the storage device at a specified time to a storage device without through a computer connected to the storage device. Using such a snapshot function, a user can use the original storage area for jobs and the data stored in the copied storage area for backup.

As a technology for improving the scalability of the storage device connected to a network, a storage system of a cluster configuration is considered. The storage system of the cluster configuration is a system having a conventional storage system such as a disk array device as one cluster and one storage system configured of plural clusters.

Conventionally, no technology of performing snapshot in the storage system of a cluster configuration is known. Where the storage system of the cluster configuration and the snapshot technology of the above-described prior art are simply combined, copy of a storage area is performed only in one cluster.

As described above, where the storage system of the cluster configuration and the snapshot technology of the above-described prior art are combined, a storage area cannot be copied between different clusters, so that a storage area which can be used as a copy destination of a storage area and a storage area which cannot be used are formed within the storage system of one cluster configuration, causing a problem that the scalability of the storage system of the cluster configuration originally intended is impaired.

In the storage system of the cluster configuration, when it is made possible to copy a logical volume (hereinafter referred to as the volume) over clusters, namely when a copy source volume and a copy destination volume are on different clusters, a device configuration in that a cluster (hereinafter referred to as the original cluster) having a volume of the copy source cannot refer to a common memory within a cluster (hereinafter referred to as the copy cluster) having a volume of the copy destination or a device configuration in that reference can be made but access performance between the clusters is low has a problem that an efficiency of preparing a copy volume between different clusters is degraded. Therefore, the system configured as described above has a limited use that a volume of the copy destination is selected within the same cluster as the copy source. Thus, there is also a problem that the device configuration is different from the prior art and the ease-of-use by a user is changed.

SUMMARY OF THE INVENTION

The present invention has been made under the circumstances described above to remedy the problems of the above-described prior arts and provides a storage system of a cluster configuration having plural storage control units to which plural disk devices are connected, which can generate a copy of the storage area without conscious of different storage control units not only when replication is created in a volume within the disk devices connected to the same storage control unit but also when replication is created in a volume within the disk devices connected to different storage control units, and a data replication method.

According to the present invention, the above-described advantage is achieved by a storage system comprising a plurality of storage control units to which plural disk devices are connected and a data replication method thereof, wherein each of the plural storage control units includes a replication creation unit which creates replication of data of a volume in the disk devices and pair information which is information about a volume of a replication source and a volume of a replication destination; and wherein, when the replication creation unit in one of the plural storage control units is to create replication in a volume within the disk devices connected to another storage control unit, all data in the volume of the replication source is copied to the volume of the replication destination, and when the storage control unit having the volume of the replication source receives a data update request to the volume of the replication source, the received data is stored in a cache memory of the storage control unit, the data is stored in a cache memory of the storage control unit of the replication destination on an extension of processing of the update request, and the update of data is reflected to the replication destination to prepare a replication volume.

According to the present invention, a storage system of a cluster configuration having plural storage control units to which disk devices are connected can create a copy of a storage area without degrading the performance by minimizing accesses to control information among the control units when replication is created in a volume within the disk devices connected to different storage control units.

Other objects, features and advantages of the invention will become apparent from the following description of the embodiments of the invention taken in conjunction with the accompanying drawings.

BRIEF DESCRIPTION OF THE DRAWINGS

FIGS. 6A and 6B are diagrams showing example configurations of a volume pair information table;

FIG. 7 is a diagram showing an example configuration of a volume information table;

DESCRIPTION OF THE EMBODIMENTS

Embodiments of a storage system and a data replication method replication method according to the present invention will be described in detail with reference to the accompanying drawings.

Figure 1:
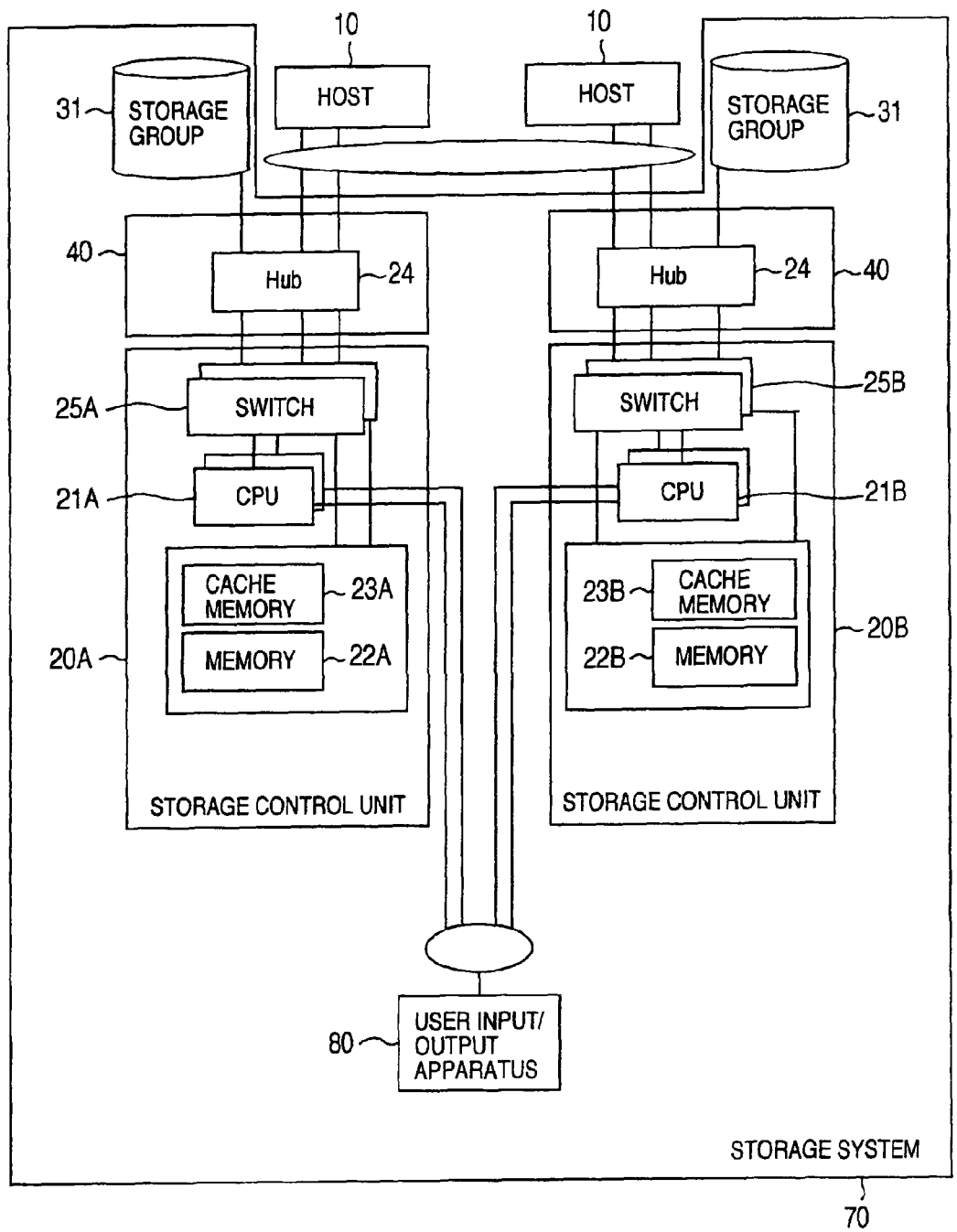
FIG. 1 is a block diagram showing a configuration of the computer system including the storage system according to a first embodiment of the present invention.

FIG. 1 is a block diagram showing a hardware configuration of a computer system including a storage system according to a first embodiment of the present invention. In FIG. 1, numeral 10 indicates a host, numerals 20A and 20B indicate storage control units, numerals 21A and 21B indicate CPUs, numerals 22A and 22B indicate memories, numerals 23A and 23B indicate cache memories, numeral 24 indicates a hub, numerals 25A and 25B indicate switches, numeral 31 indicates a storage group, numeral 40 indicates an I/F adaptor, numeral 70 indicates a storage system, and numeral 80 indicates a user input/output apparatus.

The computer system including the storage system according to the first embodiment of the present invention is configured with the host 10 connected to the storage system 70 via the I/F adaptor 40. The storage system 70 is configured of the plural storage control units 20A, 20B, the I/F adaptor 40 connected to the individual storage control units 20A, 20B, the user input/output apparatus 80 connected to the individual storage control units 20A, 20B via a management network, and the storage group 31 connected to the I/F adaptor 40. The I/F adaptor 40 is a channel connection part independent of the storage control units 20A, 20B. The shown storage system is connected to the storage system 70 and the host 10 or the storage group 31 via a different board not shown. The storage group 31 is a group of storage devices having a plurality of storage devices such as magnetic disk devices.

The storage control units 20A, 20B each have the CPUs 21A, 21B, the memories 22A, 22B and the cache memories 23A, 23B for temporarily storing I/O data from the host 10. The CPUs 21A, 21B, the memories 22A, 22B and the cache memories 23A, 23B are multiplexed and mutually connected by the switches 25. The storage control units 20A, 20B each are configured to allow the CPU in them to access the memory and the cache memory therein.

According to the first embodiment of the present invention configured as described above, the I/F adapter 40 having received an I/O request from the host 10 sends the pertinent request to the storage control units 20A, 20B. The CPUs 21A, 21B in the storage control units 20A, 20B obtain and analyze the command, and if the request is read, judge whether the cache memories 23A, 23B have the object data therein; if the data is available, the CPUs 21A, 21B send the data to the host 10 via the hub 24 within the I/F adapter 40 but, if the cache memory 23 does not have the data, secure a region in the cache memories 23A, 23B, read out data from the storage group 31, execute staging in the region secured in the cache memories 23A, 23B and send the data to the host 10.

Figure 2:
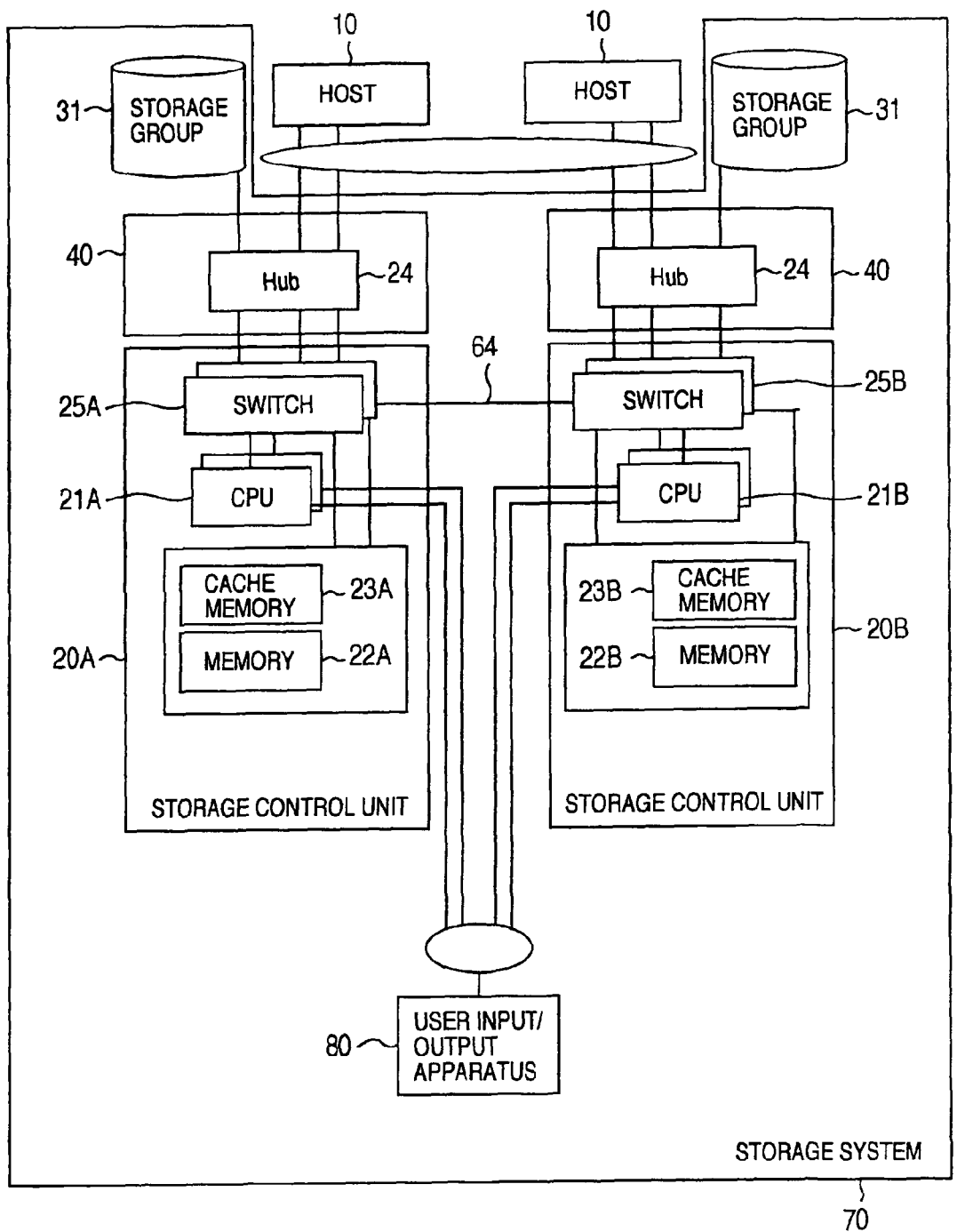
FIG. 2 is a block diagram showing a configuration of the computer system including the storage system according to a second embodiment of the present invention.

FIG. 2 is a block diagram showing a hardware configuration of a computer system including a storage system according to a second embodiment of the present invention, and numerals in FIG. 2 are same as those in FIG. 1.

The computer system including the storage system according to the second embodiment of the present invention shown in FIG. 2 is different from the first embodiment of the present invention shown in FIG. 1 on the point that the switch 25A in the storage control unit 20A and the switch 25B in the storage control unit 20B are mutually connected, and the storage control units 20A and 20B are mutually connected. Thus, the storage control units 20A, 20B are mutually connected via the switches 25A, 25B in the second embodiment, so that the individual CPUs in the storage control units 20A, 20B can access the memory in the other storage control unit.

For example, the CPU 21A of the storage control unit 20A can access the memory 21B in the storage control unit 20B via the switch 25. A connection line 64 between the switch 25A of the storage control unit 20A and the switch 25B of the storage control unit 20B may be a bus or a network. But, when the storage control units mutually access the memory and cache memory in the other storage control unit in the second embodiment shown in FIG. 2, the connection line 64 (a bus or a network configured of hardware) has a slow access speed in performance as compared with the case of accessing the memory and cache memory in the same storage control unit.

Figure 3:
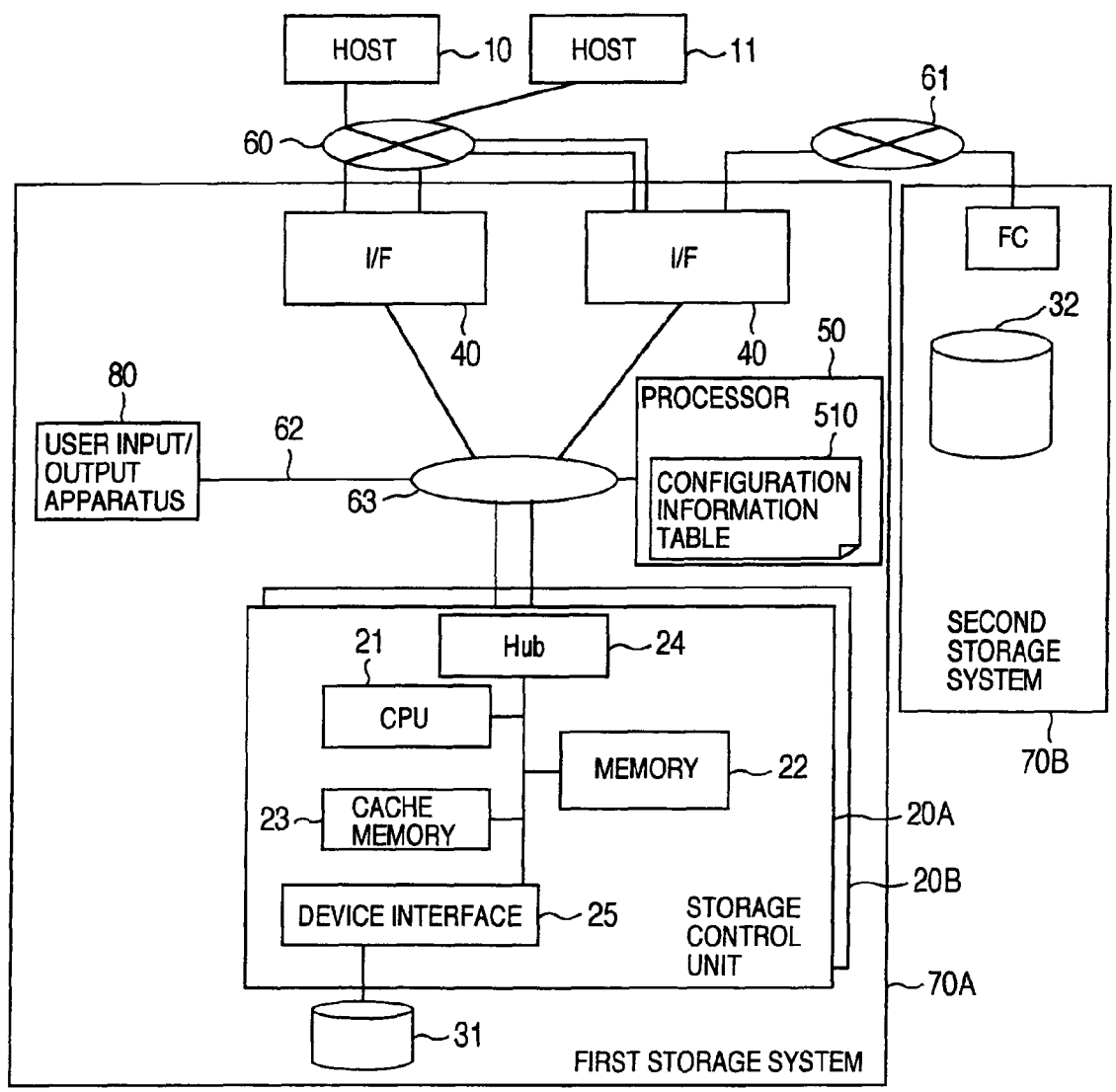
FIG. 3 is a block diagram showing a configuration of the computer system including the storage system according to a third embodiment of the present invention.

FIG. 3 is a block diagram showing a structure of the storage system according to a third embodiment of the present invention. In FIG. 3, numeral 25 indicates a device interface, numeral 32 indicates a storage group, numeral 50 indicates a processor, numerals 60 to 63 indicate networks, numeral 510 indicates a configuration information table, and other numerals are same as those in FIG. 1.

The computer system including the storage system according to the third embodiment of the present invention shown in FIG. 3 is configured with a first storage system 70A connected to the host 10 via the network 60 and the first storage system 70A and a second storage system 70B connected via the network 61. A user input/output apparatus 80 can be connected to each part in the first storage system 70A via the management networks 62, 63. The first and second storage systems 70A, 70B are configured in the same way, but only the first storage system 70A is shown its inside structure in FIG. 3, and the inside structure of the storage system 70B is omitted. Here, it is shown that the second storage system 70B is connected, but the present invention may have the structure without connecting the second storage system 70B.

The first and second storage systems 70A, 70B are basically storage systems having the same functional structure as those described with reference to FIG. 1 and FIG. 2. The first storage system 70A is provided with plural I/F adaptors 40 which are channel connection portions independent of the storage control units 20A, 20B and treat protocols in conformity with LAN (Local Area Network), public line, dedicated line and ESCON (Enterprise Systems Connection); the plural I/F adaptors 40 and the plural storage control units 20A, 20B are connected via the network 63. According to the third embodiment, the processor 50 having the configuration information table 510 is connected to the network 63, and the storage group 31 is connected to the storage control unit 20A via the device interface 25A.

According to the third embodiment of the present invention configured as described above, the I/F adaptor 40 receives an I/O request from the host 10, analyzes the command to perform protocol conversion, judges LU (Logical Unit), in which data demanded by the command is stored, whether it is managed under control of either of the storage control units 20A and 20B or by the storage system 70B, and sends the I/O request to the judged location. It is judged which device manages the LU storing the above-described request data with reference to the configuration information table 510 stored in the memory within the processor 50 connected via the network 63.

The user input/output apparatus 80 recognizes each part within the first storage system 70A via the network 62 but can be configured to directly connect through a dedicated line.

The storage control unit 20A has a CPU 21A, a memory 22A, a cache memory 23A for temporarily storing I/O data from the host 10, the hub 24 for connection to the network 63 and a device interface 25 for controlling sending/receiving of data to/from the storage group 31, which are mutually connected via an internal bus. The storage control unit 20B also has the same configuration.

The hardware configuration of the computer system provided with the storage system according to the first to third embodiments of the present invention were briefly described above. Individual components common to the individual embodiments will be described below.

Figure 4:
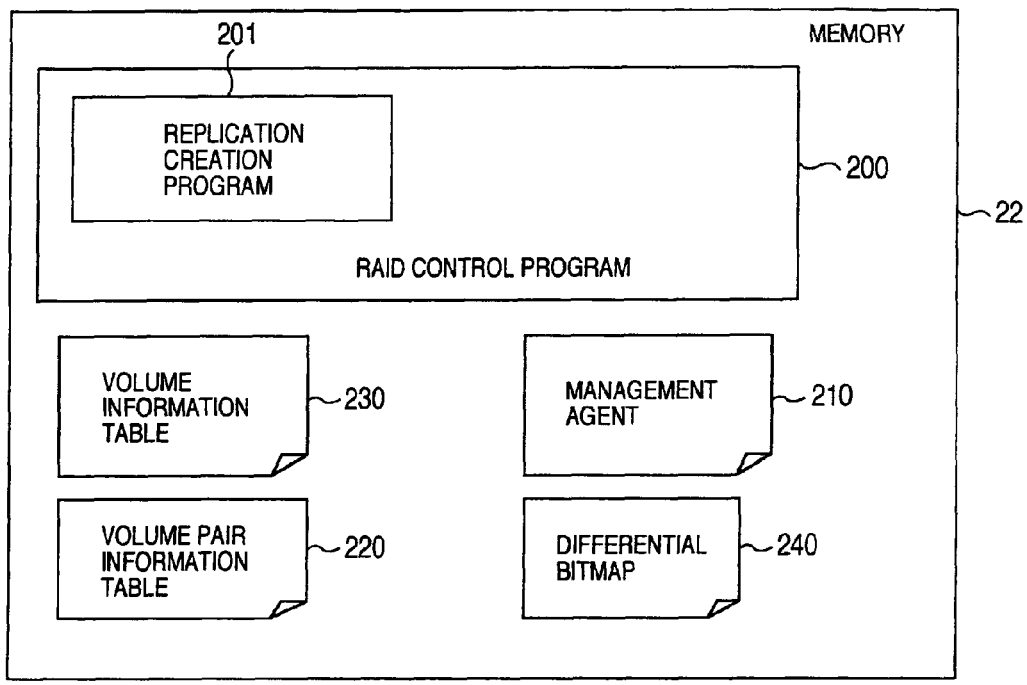
FIG. 4 is a diagram showing the configuration within a memory.

FIG. 4 is a diagram showing an internal structure of the memory 22A (the memory 22B also has the same structure, and these memories are simply referred to as the memory 22 below). In FIG. 4, 200 is a RAID (Redundant Array of Inexpensive Disks) control program, 201 is a replication creation program, 210 is a management agent, 220 is a volume pair information table, 230 is a volume information table, and 240 is a differential bitmap.

As shown in FIG. 4, the memory 22 stores various programs to be executed by the CPU 21. Specifically, they are the RAID control program 200 for controlling the operation of the storage systems 70, 70A, 70B and the management agent 210 for managing the storage system configuration. The memory 22 also stores various kinds of management information. Specifically, they are the volume pair information table 220 for recording information about a data copy source and copy destination, the volume information table 230, the differential bitmap 240 and a configuration information table (not shown) that the storage system 70B provides the storage system 70A with its own LU as the LU of the storage system 70A.

The RAID control program 200 has a functional portion (not shown) for issuing a command to the storage group 31, and the RAID control program 200 has therein as a subprogram the replication creation program 201 for creating replication of data within the storage system 70. To execute the replication of data, there are variations of synchronization (the completion is reported to a higher device upon the completion of copy) and asynchronization (the completion is reported to the higher device without the completion of copy), but they are not particularly distinguished in the embodiments of the present invention. The management agent 210 is a program for setting information about storage device (hereinafter referred to as storage device information) upon receiving input from the user input/output apparatus 80 and outputting storage device information to the user input/output apparatus 80.

Figure 5:
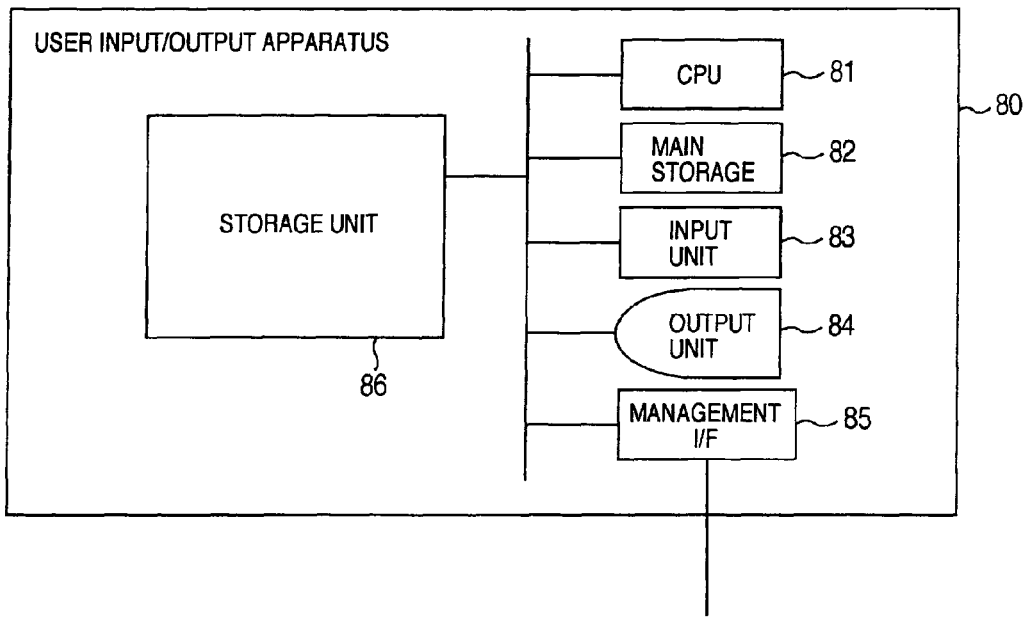
FIG. 5 is a block diagram showing the configuration of a user input/output apparatus.

FIG. 5 is a block diagram showing a structure of the user input/output apparatus 80, which will be described below. The user input/output apparatus 80 includes a CPU 81, a main storage 82, an input unit (keyboard, etc.) 83, an output unit (display device, etc.) 84, a management I/F 85 for connection with an outside device and a storage unit 86, and they are mutually connected via an internal bus as shown in FIG. 5.

The host 10 is, for example, a personal computer, a workstation, a general-purpose computer or the like and provided with HBA (Host Bus Adaptor) as an FC interface for connection to the outside. The HBA is provided with a WWN.

FIG. 6A and FIG. 6B are diagrams showing an example configuration of the volume pair information table 220. The volume pair information table 220 is information for managing a pair of volumes (hereinafter referred to as the pair) for holding the copied data within the storage system 70 (the same is also applied to 70A and 70B; 70 is used to indicate the storage system unless otherwise specified) and includes the fields for a pair number 221, original volume information 222, copy volume information 224, and a pair status 226. And, the volume pair information table 220 includes a volume pair information table 220A in the same storage control unit which is an information table at the time of creation of replication within the same control storage control unit as shown in FIG. 6A and a volume pair information table 220B in a different storage control unit which is an information table at the time of creation of replication within a different storage control unit as shown in FIG. 6B.

In the tables 220A, 220B, the pair number 221 indicates an identifier arbitrarily allocated to the pair of original and copy volumes. The original volume information 222 indicates volume numbers allocated to the original volume among the pairs to which the identifier is given in the table 220A and a storage control unit number 227 and a volume number 223 which are allocated to the original volume among the pairs to which the identifier is given in the table 220B. The copy volume information 224 indicates the volume numbers allocated to the copy volume among the pairs to which the identifier is given in the table 220A and indicates a storage control unit number 228 and a volume number 225 which are allocated to the copy volume among the pairs to which the identifier is given in the table 220B. The pair status 226 indicates the present status of the pair. For example, such a status includes a status that data stored in the individual volumes of the pair are synchronized and the contents of the stored data match (hereinafter referred to as a Pair status), a status that data are not synchronized among the pairs (hereinafter referred to as a Split status), and the like.

The storage system 70 can change, for example, a pair in the Pair status into the Split status in a prescribed time. At this time, data possessed by the pair at the prescribed time is stored in the copy volume (this processing is called "an acquisition of snapshot"). Then, the host 10 reads out data from the copy volume and writes in another storage device, e.g., a tape device, so that data stored in the pair at the time when the snapshot is acquired can be backed up. After the acquisition of the snapshot, the copy volume itself may be stored as backup of the data.

Information of the pair having a copy source and a copy destination in the storage control unit 20A is stored in the memory 22A within the storage control unit 20A, and information of the pair having a copy source and a copy destination in the storage control unit 20B is stored in the memory 22B within the storage control unit 20B. Information of the pair between the storage control units having different copy source and copy destination in the storage control units 20A and 20B is stored in the memory 22A of the storage control units 20A and 20B and volume pair information table 220B in 20B.

For example, when the volume pair information table 220A in the same storage control unit is in a storage control unit No. 1, it is seen that pair number 0 is a pair of volume numbers 100 and 10 in the storage control unit No. 1. It is also seen that pair No. 1 is a pair of volume No. 110 of the storage control unit No. 1 and volume No. 120 of the storage control unit No. 2.

FIG. 7 is a diagram showing an example structure of the volume information table 230. This volume information table 230 is registered with information for managing the volume under control by the storage control unit 20A and is stored in the memory within the storage control unit 20A and includes the fields for a volume number 231, original/copy 232 indicating the original and copy of a volume, a pair volume number 236 and a volume status 235 indicating whether the volume is being used or not.

The volume number 231 is an identifier which is allocated to the volume. The example shown in FIG. 7 has three pairs set up for volume number 0 of the own storage control unit. The example shown in FIG. 7 shows that a first pair indicates that the copy volume which is a pair volume is volume No. 20 of the storage control unit No. 1, and a second pair indicates that the copy volume is volume No. 158 within the same storage control unit (indicated by "-"). A third pair indicates that the copy volume is volume No. 426 of the storage control unit No. 1. Besides, volume No. 1 of the own storage control unit is being used as the copy volume of the pair, indicating that the original volume is volume No. 3783 of the storage control unit No. 3.

A storage control unit number 233 and a volume number 234 in the pair volume information 236 are pair volume information when they are paired. In a case of the pair in the same storage control unit, only the copy volume number is registered in the volume number 234. In a case of a pair between different storage control units, the storage control unit number of the copy volume is registered in the storage control unit number 233 and the volume number is registered in the volume number 234. The volume status 235 is information indicating whether the volume is in use or available.

Figure 8A:
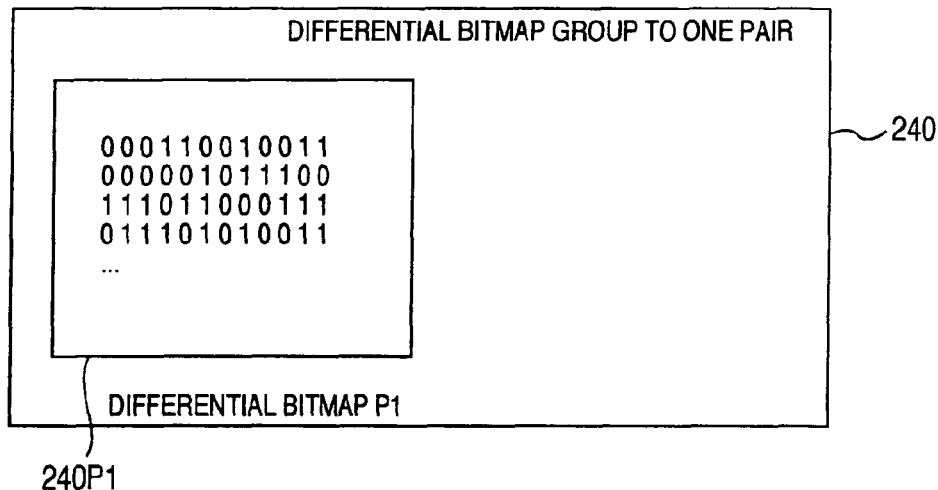
FIGS. 8A and 8B are diagrams illustrating examples of a differential bitmap.
Figure 8B:
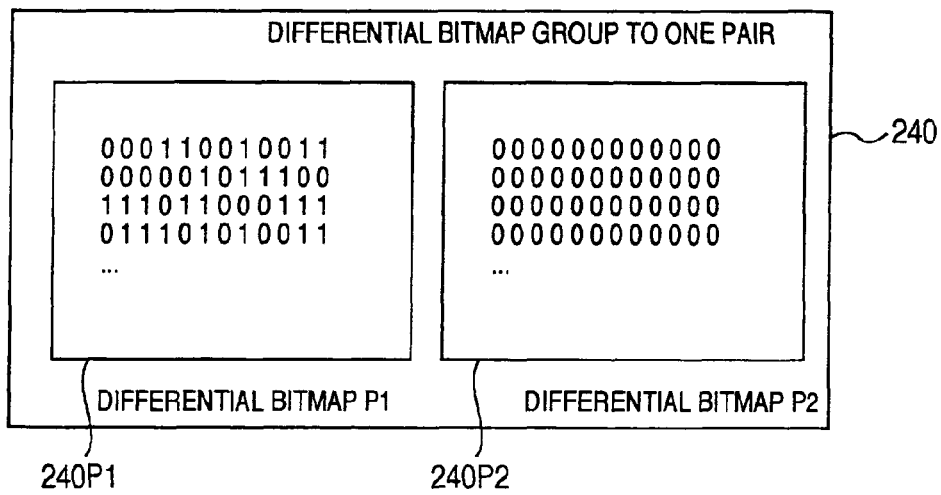

FIG. 8A and FIG. 8B are diagrams illustrating examples of the differential bitmap 240. The differential bitmap has 1 bit corresponded to data having a predetermined size and a value determined as "1" if even 1 bit in the data having a predetermined size of one of the pair is updated, and indicates for each predetermined data size whether the copy between the pairs has completed.

Specifically, the differential bitmap has data having a prescribed data size corresponded to a bit, its value "0" indicates a portion where the copy has completed, and the value "1" indicates a portion where the copy has not completed. For example, when data of 64 KB is corresponded to one bit and even 1 B is updated in the data of 64 KB, the bit is determined to be "0" so that the content is reflected to the copy destination. According to the first to third embodiments of the present invention, only one differential bitmap P1 is advantageously provided as shown in FIG. 8A, and in a fourth embodiment of the present invention to be described later, two bitmaps P1 and P2 having the same size are provided for one pair as shown in FIG. 8B.

Figure 9A:
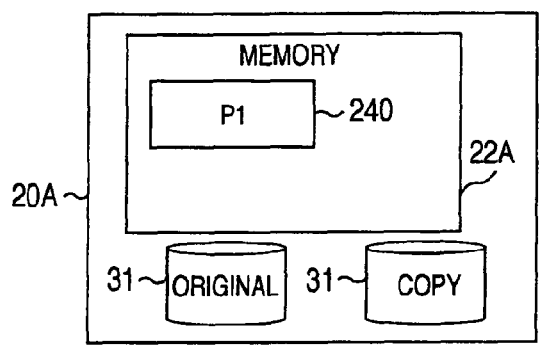
FIGS. 9A and 9B are diagrams showing an example arrangement of differential bitmaps of the first to third embodiments of the present invention.
Figure 9B:
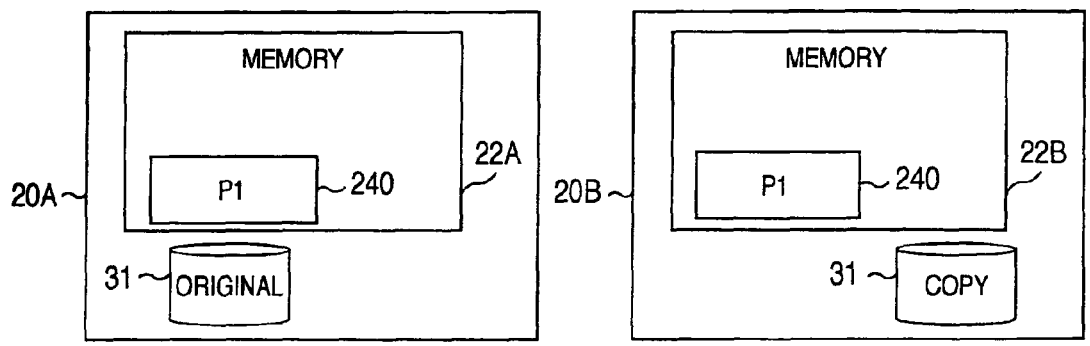

FIG. 9A and FIG. 9B are diagrams showing an example arrangement of the differential bitmaps according to the first to third embodiments of the present invention.

When replication is to be created in the same storage control unit as shown in FIG. 9A, its pair is created in, for example, the storage group 31 connected to the storage control unit 20A, and the differential bitmap 240 is created as P1 in the memory 22A of the storage control unit 20A. When replication is created in different storage control units as shown in FIG. 9B, its pair is created in, for example, the storage group 31 to be connected to the storage control unit 20A and the storage group 31 to be connected to the storage control unit 20B, the differential bitmap 240 is created as P1 in the memory 22A of the storage control unit 20A and as S1 in the memory 22B of the storage control unit 20B. And, the differential bitmaps P1 and S1 are controlled so to match mutually.

Then, in the storage systems according to the first to third embodiments of the present invention, an operation of creating a copy volume of a volume, which is in the storage control unit 20A, in the storage control unit 20A or 20B will be described.

Figure 10:
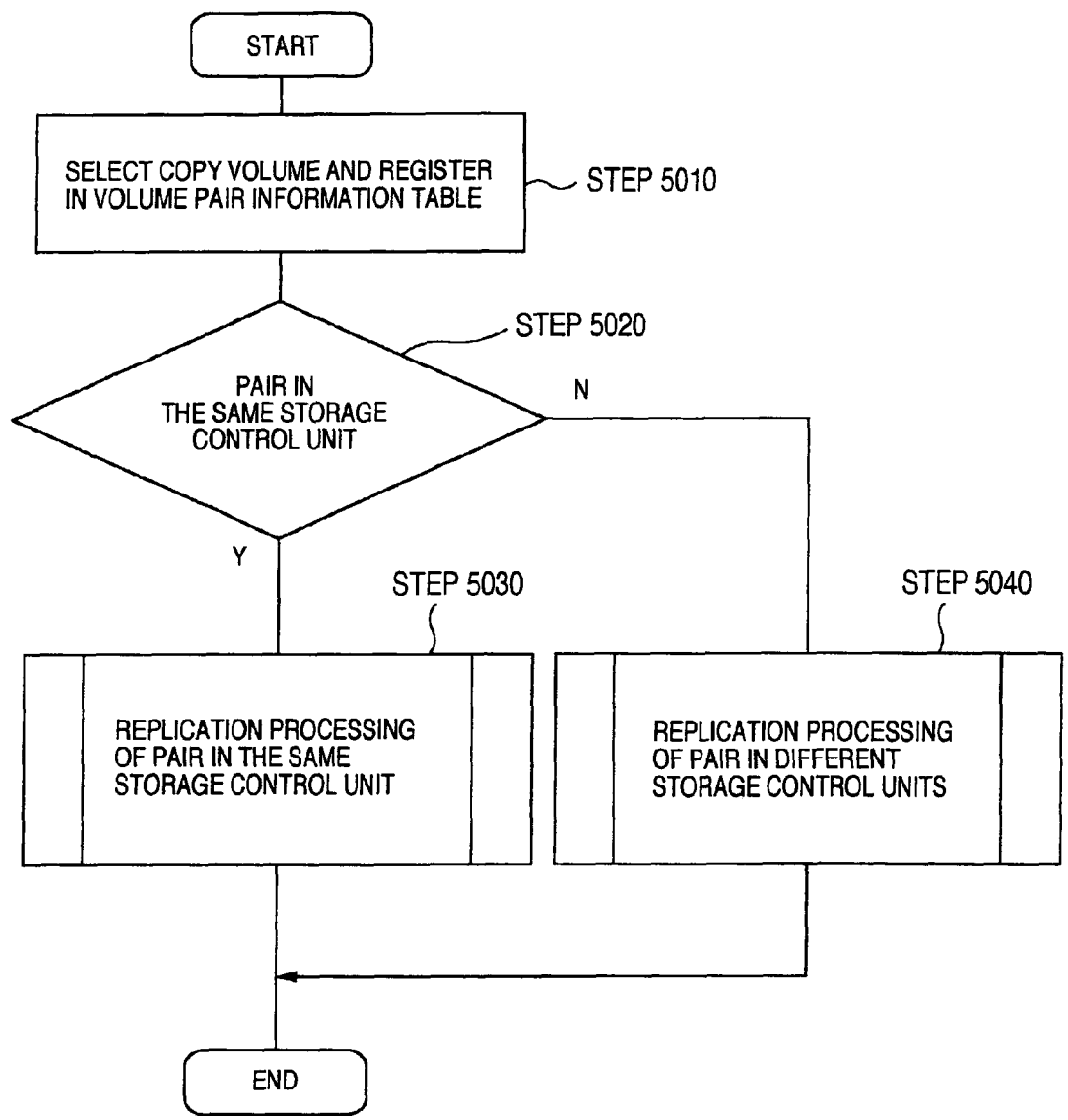
FIG. 10 is a flowchart illustrating a processing operation to prepare replication by the storage systems according to the first to third embodiments of the present invention.

FIG. 10 is a flowchart illustrating a processing operation to create replication by the storage systems according to the first to third embodiments of the present invention, and this processing operation will be described. The copy volume is created by the replication creation program 201. The replication creation program 201 checks whether the original and copy volumes of a replication pair are within the same storage control unit or between the different storage control units and performs processing of the pair in the same storage control unit and the pair between the different storage control units.

(1) First, one volume is selected as a copy volume from available volumes, wherein the selected volume (the copy volume) is used as a copy destination. And, information about original volume and copy volume configuring the pair is registered in the volume pair information table 220 with the original and copy volumes determined as a pair. In this case, the registration is made in the table 220A or the table 220B depending on whether the pair is in the same storage control unit or not (step 5010).

(2) It is judged whether the pair is in the same storage control unit 20 (step 5020), and if the pair is within the storage control unit 20, the replication creation processing in the same storage control unit is executed (step 5030), and if the pair is in the different storage control units 20, the replication creation processing is executed between the different storage control units (step 5040).

Figure 11:
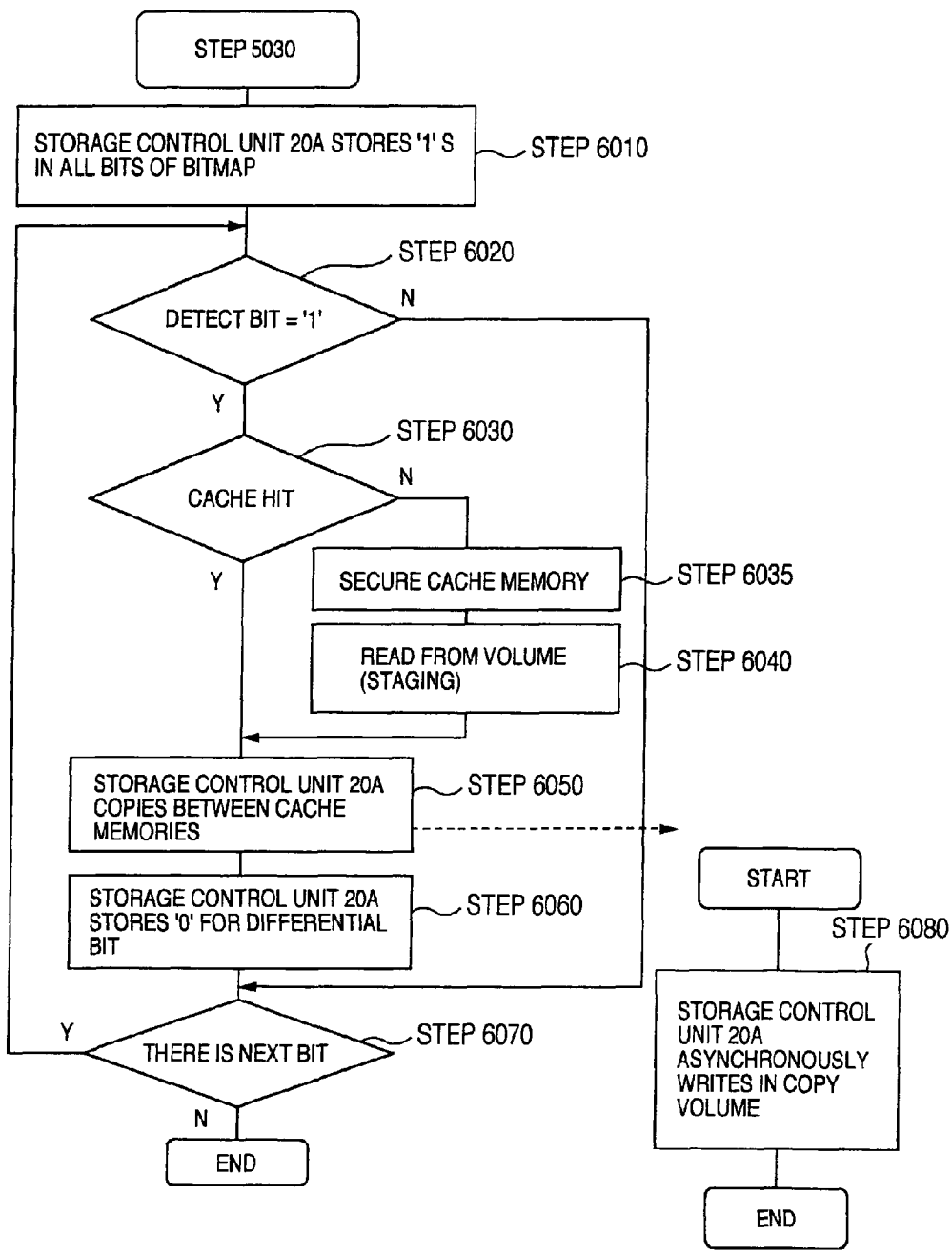
FIG. 11 is a flowchart illustrating a processing operation to prepare replication in the same storage control unit by the processing in step 5030 shown in FIG. 10.

FIG. 11 is a flowchart illustrating a processing operation for creation of replication in the same storage control unit by the processing in the above-described step 5030, and this processing operation will be described below.

(1) Initial copy processing for whole copy of the content of the original volume into the copy volume is started. And, a differential bitmap P1 is created as shown in FIG. 9A, and all differential bits of P1 of the differential bitmap 240 are set to "1" because this is an initial copy (step 6010).

(2) It is detected whether the value of an initial differential bit on the differential bitmap is "1" (step 6020). If "1" is detected, it is judged whether data at a portion corresponding to the pertinent bit is in the cache memory, namely whether it is a cache hit or not (step 6030).

(3) If the data is not in the cache memory when judged in the step 6030, a region is secured in the cache memory (step 6035), and corresponding data is read out from the original volume and stored in the region secured in the cache memory. This step is called staging (step 6040).

(4) When it is found by the judgment made in the step 6030 that the data is in the cache memory or when the staging is executed by the processing in the step 6040, a copy of the pertinent data is created for data of the copy volume within the cache memory. In this copying operation, redundant information for judging whether data is correct or not is also created newly for the copy volume and attached to the data (step 6050).

(5) After the copy for data of the copy volume is created in the cache memory, a corresponding differential bit of the differential bitmap is set to "0" (step 6060).

(6) If the value of the differential bit is not "1" in the step 6020, namely if the value of the differential bit is "0", or when it is judged whether there is a next differential bit after the processing in the step 6060 and there is a next differential bit, the processing returns to the step 6020 to repeat the same processing, and when the next differential bit disappears, the processing here is terminated (step 6070).

(7) Meanwhile, the data for the copy volume copied on the cache memory by the processing in the step 6050 is stored in the copy volume in asynchronization with the above-described processing operation (step 6080).

In the above-described processing operation, when data is to be read from the original volume into the cache memory, redundant information for the copy volume may be created and stored directly as data for the copy volume in the cache memory.

Figure 12:
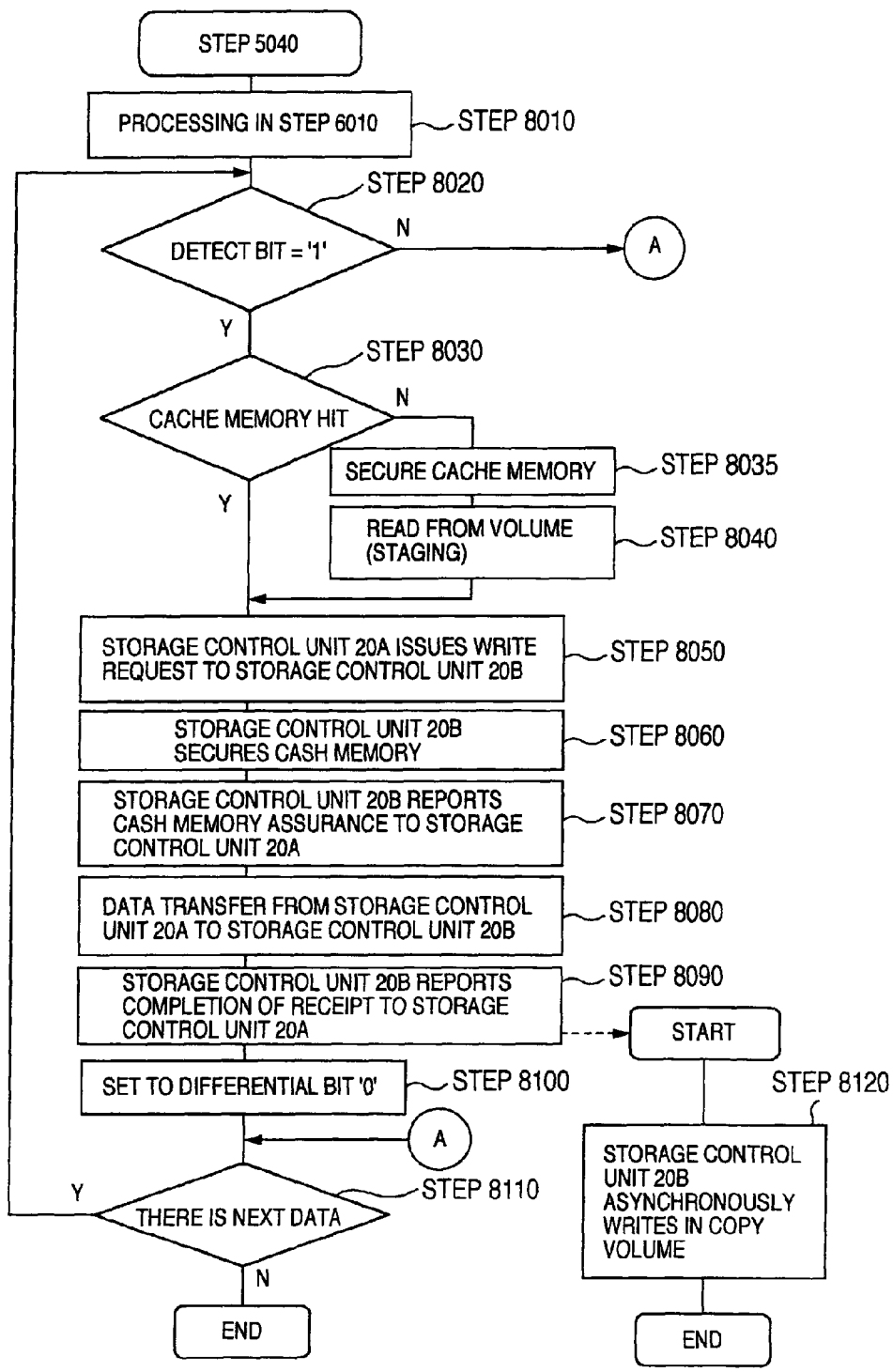
FIG. 12 is a flowchart illustrating a processing operation to prepare replication between different storage control units by the processing in step 5040 shown in FIG. 10.

FIG. 12 is a flowchart illustrating a processing operation of the replication creation between the different storage control units by the processing in the above-described step 5040, and this processing operation will be described below.

(1) Initial copy processing for the whole copy of the content of the original volume into the copy volume is started. To create replication between different storage control units, the differential bitmap is created as P1, S1 in the memories of the storage control units 22A, 22B as shown in FIG. 9B. And, all bits of P1, 51 of the differential bitmap 240 are set to "1" because this is an initial copy (step 8010).

(2) It is detected whether the value of the initial differential bit on the differential bitmap on the side of the original volume is "1" or not (step 8020). If the value "1" is detected, it is judged whether data at a portion corresponding to its bit is in the cache memory or not, namely whether it is a cache hit or not (step 8030).

(3) If data is not in the cache memory when judged in the step 8030, a region is secured in the cache memory (step 8035), corresponding data is read out of the original volume and read into the region secured in the cache memory. This procedure is called staging (step 8040).

(4) If data is in the cache memory, namely if it is a cache hit, when judged in the step 8030, or after the processing in the step 8040, the storage control unit 20A having the original volume issues a write request to the storage control unit 20B which creates a copy volume (step 8050). The storage control unit 20B on the copy side having received the write request secures a cache memory for storage of write data (step 8060) and reports the storage control unit 20A on the original side that the cache memory has been secured (step 8070).

(6) Upon receiving the report about the ensurance of the cache memory in the step 8070, the storage control unit 20A on the original side transfers the write data to the storage control unit 20B on the copy side (step 8080) and receives a transfer completion report from the storage control unit 20B on the copy side (step 8090).

(7) The storage control unit 20A on the original side sets the value of a corresponding bit of P1 of the differential bitmap 240 of the own unit to "0" (step 8100).

(8) If the value of the differential bit is not "1" in the step 8020, namely if the value of the differential bit is "0", or it is judged whether there is a next differential bit (step 8110) after the processing in the step 8100 and, if there is a next differential bit, the process returns to the step 8020 to repeat the processing. When the next differential bit disappears, the processing here is terminated.

(9) In asynchronization with the above-described processing operation, the storage control unit 20B on the copy side stores data for the copy volume stored in the cache memory into the copy volume (step 8120).

When the initial copy processing is completed by performing the above-described flows of FIG. 11 and FIG. 12, the differential bitmap has all differential bits with a value "0".

During the processing of the initial copy according to the flows of FIG. 11 and FIG. 12 described above, there is a possibility that a normal read/write request arrives. Then, a processing upon the reception of a write request during the processing of the initial copy will be described.

Figure 13:
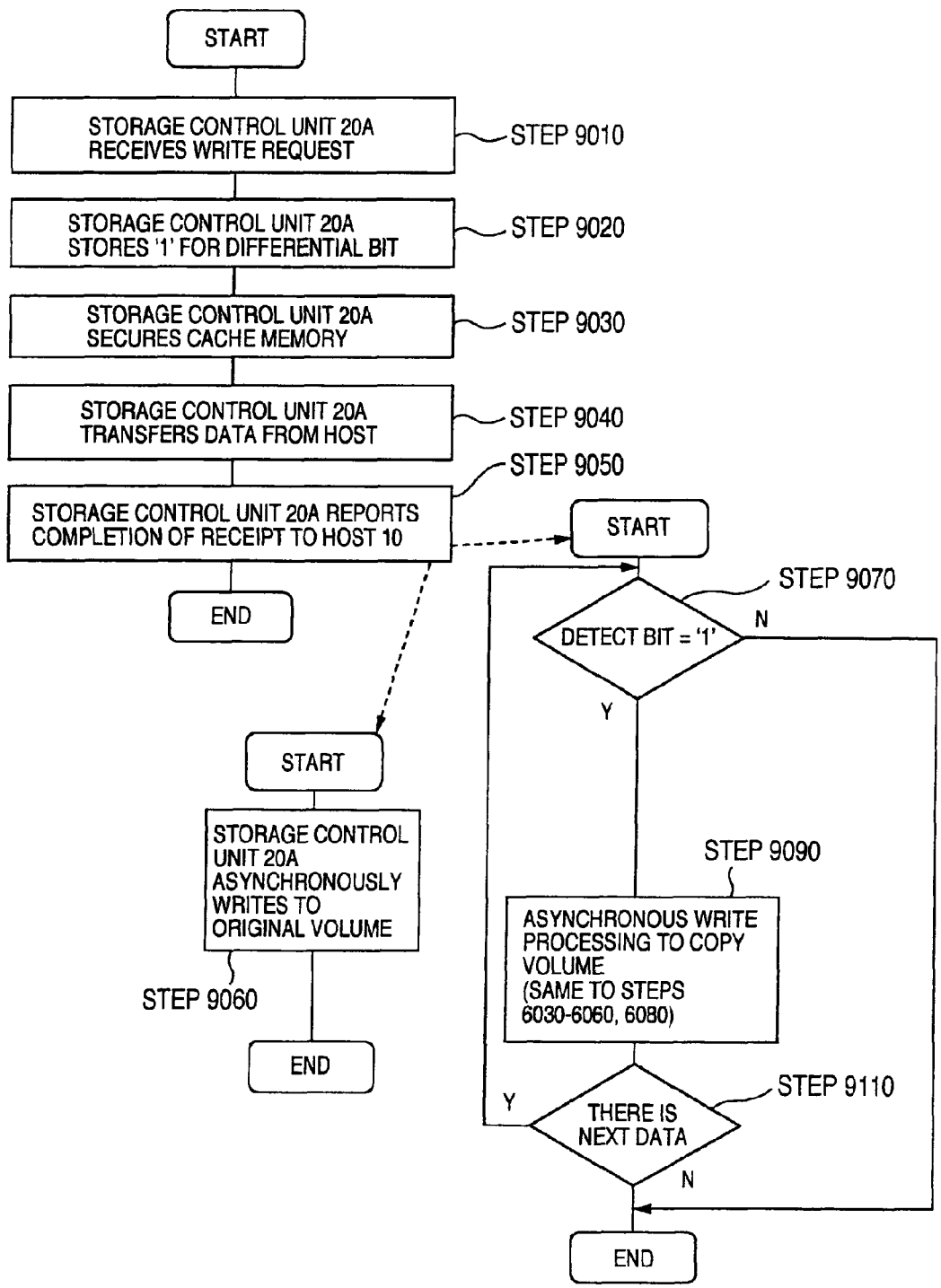
FIG. 13 is a flowchart illustrating an operation when a write request is made during the replication creation processing in the same storage control unit illustrated with reference to FIG. 11.

FIG. 13 is a flowchart illustrating an operation in case of a write request during the processing for creation of replication in the same storage control unit described with reference to FIG. 11, and this operation will be described below.

(1) When the storage control unit 20A receives a write request from the host 10 (step 9010), the storage control unit 20A sets a differential bit at a portion corresponding to write the object data of P1 of the differential bitmap 240 to "1" (step 9020).

(2) The storage control unit 20A secures a cache memory region for write data storage (step 9030), receives the write data transferred from the host 10 and stores it in the cache memory (step 9040).

(3) The storage control unit 20A returns a write completion report to the host 10 (step 9050), stores write data in the cache memory into the original volume in asynchronization with the write request from the host 10 (step 9060).

(4) Meanwhile, the processing for reflecting the content of the write data into the copy volume sequentially refers to the differential bitmaps, detects a differential bit "1" (step 9070) and, if "1" is not detected, namely if all differential bits of the differential bitmap are "0", the processing is terminated without doing anything.

(5) If the differential bit "1" is detected in the step 9070, the same processing as in the steps 6030 to 6060 and 6080 described with reference to the flow shown in FIG. 11 is executed, data is asynchronously written in the copy volume (step 9090), it is judged whether there is a next differential bit, namely next data (step 9110), and if there is, the processing returns to the step 9070 and the processing is repeated, and if there is not, the processing here is terminated.

The storage systems according to the first to third embodiments of the present invention employ a method not using the differential bitmap for a pair extending over the storage control units in response to a read/write request during the initial copy. And, at the time of the initial copy for creation of replication between the different storage control units, "1" is registered for all differential bits of P1 of the differential bitmap 240, and the same processing as that described above is executed. If a write request occurs during this processing, the storage control unit 20A stores data in the cache memory of the own device and transfers data to the storage control unit 20B as a continuation of the same write request.

Figure 14:
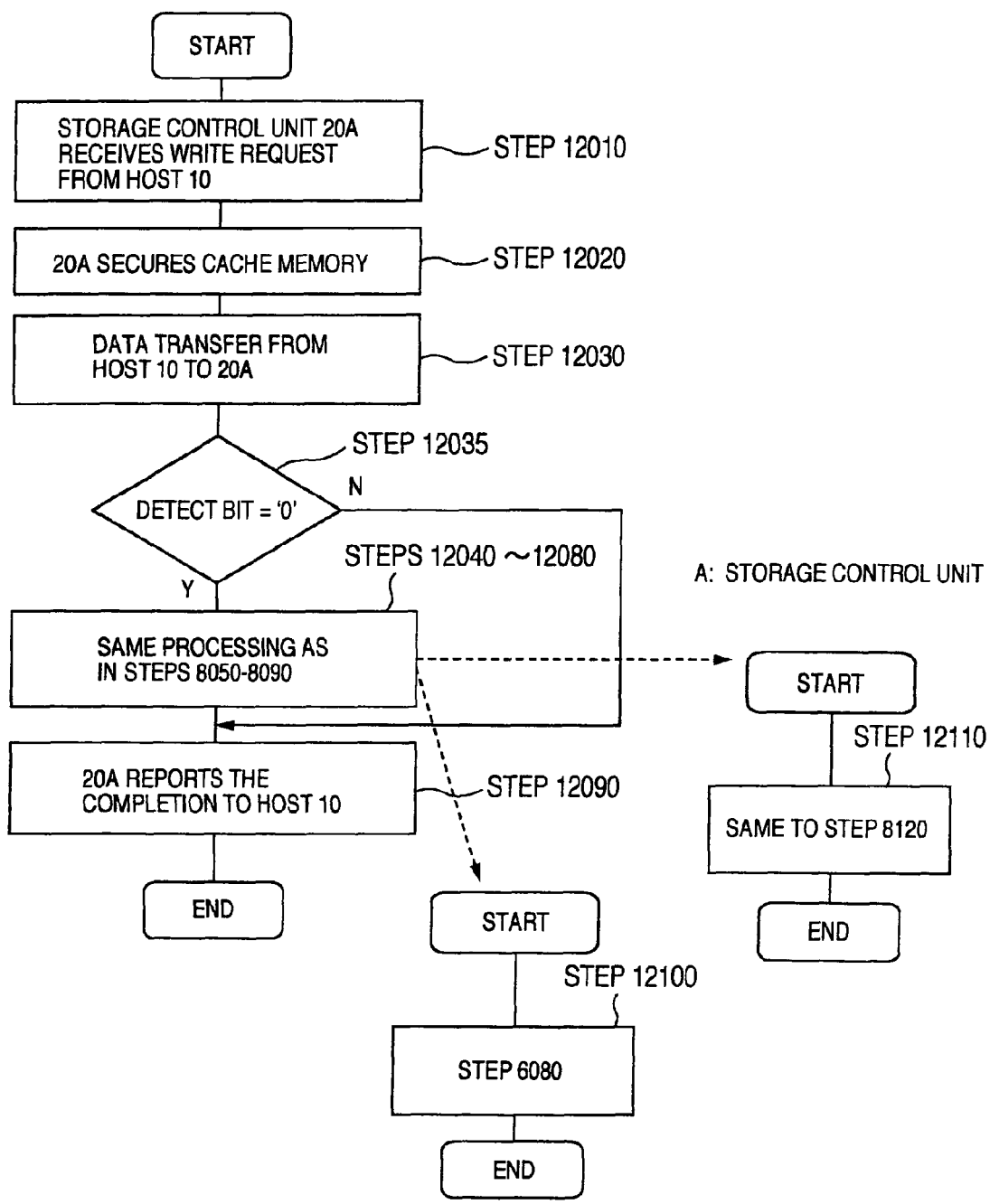
FIG. 14 is a flowchart illustrating an operation when a write request is made during the replication creation processing between the different storage control units illustrated with reference to FIG. 12.

FIG. 14 is a flowchart illustrating an operation in case of a write request during the processing for creation of replication between the different storage control units described with reference to FIG. 12, and this operation will be described below.

(1) Upon receiving a write request from the host 10 (step 12010), the storage control unit 20A secures a memory region in the cache memory for storage of write date (step 12020) and receives the write data from the host 10 to store in the region secured in the cache memory (step 12030).

(2) It is detected whether the differential bit corresponding to write data of the differential bitmap is "0" (copied) or not (step 12035). If the differential bit is "0", the storage control unit 20A issues a write request to the storage control unit 20B having a copy volume in the same way as the processing in the steps 8050 to 8090 described with reference to FIG. 12 and transfers the data (steps 12040 to 12080).

(3) If the differential bit is not "0" when detected in the step 12035, namely if it is "1", corresponding data is data not having completed the initial copy, so that the write data is stored in the cache memory of the storage control unit 20A and copies to the storage control unit 20B on the copy side at the time of the initial copy processing. Then, the storage control unit 20A reports the completion to the host 10 and terminates the processing (step 12090).

(4) The data stored in the cache memory of the storage control unit 20A on the original side is asynchronously written (destaged) to the original volume by the same processing as in the step 6080 (step 12100), and the data stored in the cache memory of the storage control unit 20B on the copy side is asynchronously written (destaged) to the copy volume by the same processing as in the step 8120 (step 12110).

Figure 15:
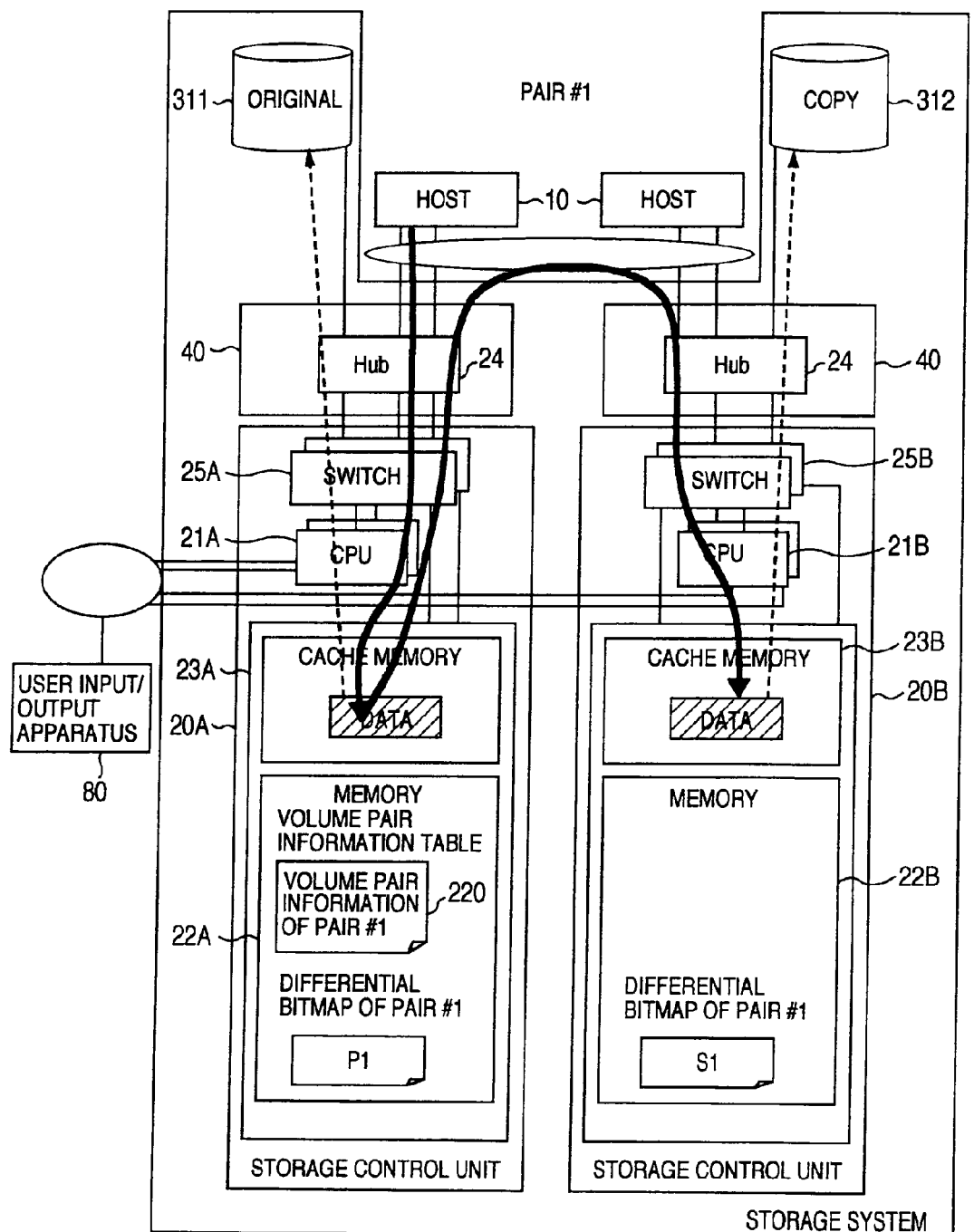
FIG. 15 is a diagram showing a data transfer path when a write request is made during the replication creation processing between the different storage control units illustrated with reference to FIG. 14.

FIG. 15 is a diagram showing a data transfer path in case of a write request during the processing for creation of replication between the different storage control units described with reference to FIG. 14. FIG. 15 also shows an arrangement of the differential bitmap.

It is apparent from the description with reference to FIG. 14 and also from the data transfer path shown in FIG. 15, if there is a write request during the processing for creation of replication between the different storage control units, the reflection of update to the copy volume can be executed as a continuation of the same I/O processing when a write request is received. The write request for update to the copy volume in this case is sent from the CPU 21A to the CPU 21B through the same route as the data transmission line.

When a pair is set up between the different storage control units and a synchronized state of the contents of the original and copy volumes in a pair status becomes a split status after the termination of the initial copy, if there is a write request from the host 10, the storage control unit 20A updates the differential bit of the differential bitmap P1, and the storage control unit 20B updates the differential bit of the differential bitmap S1. The embodiments of the present invention have one each of the original and a copy of the differential bitmap, and when the pair is in the split status, the replication processing can be realized by updating the differential bitmap in each storage control unit. If there is a write request to the pair in the same storage control unit, the update position may be stored in the differential bitmap P1.

Figure 16:
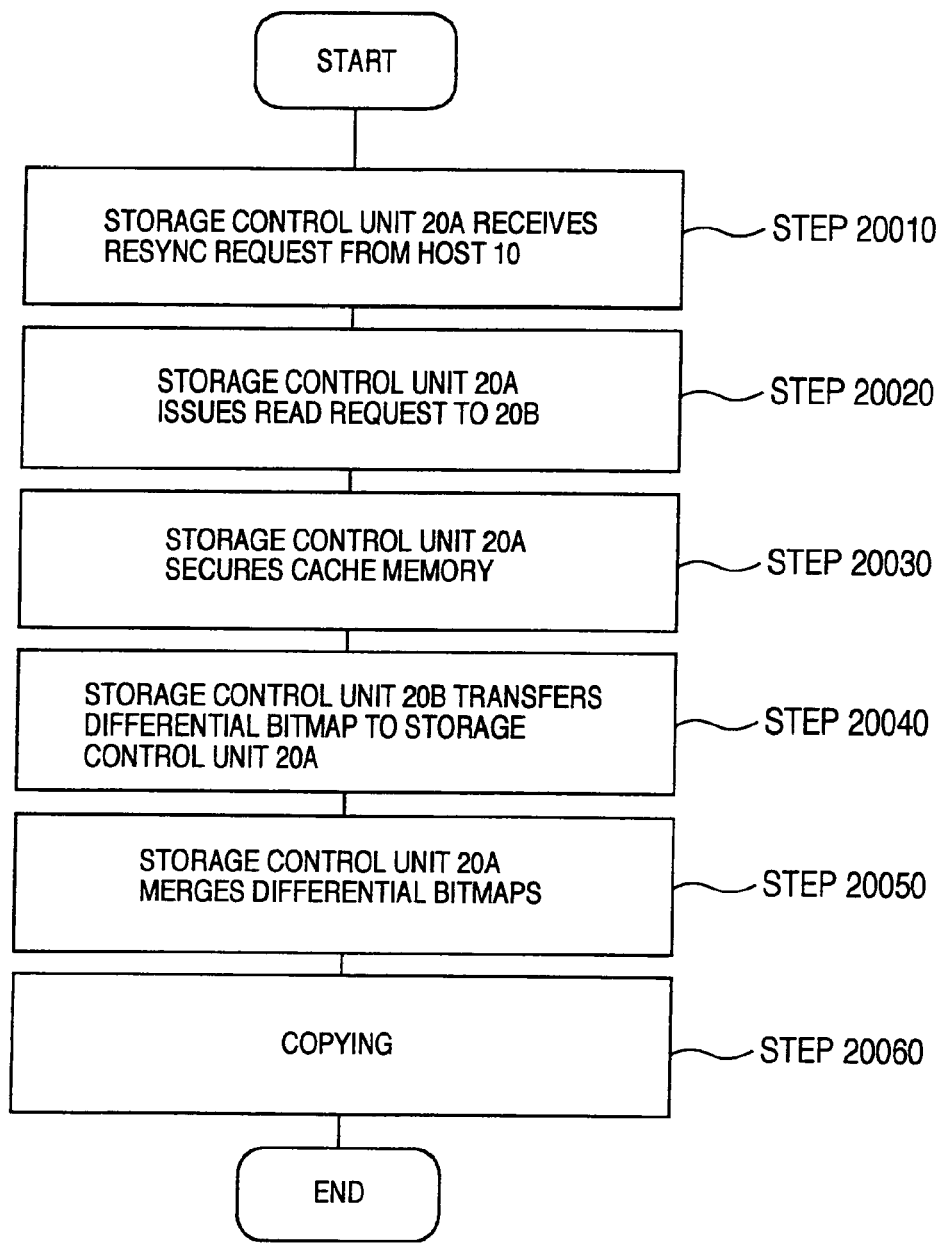
FIG. 16 is a flowchart illustrating a processing operation for resynchronization of a pair between different storage control units by the storage systems according to the first to third embodiments of the present invention.

FIG. 16 is a flowchart illustrating a processing operation of resynchronization of the pair between the different storage control units of the storage system according to the first to third embodiments of the present invention, and this processing operation will be described below. The resynchronization processing (Resync) is a processing for synchronizing the copy volume with the content of the original volume, namely a processing for copying the content of the original volume at that time to the copy volume.

(1) Upon receiving a Resync request from the host 10 (step 20010), the storage control unit 20A issues a read request of the differential bitmap to the storage control unit 20B (step 20020).

(2) The storage control unit 20A secures a cache memory for a differential bitmap to be received (step 20030), and the storage control unit 20B transfers the differential bitmap S1 to the storage control unit 20A (step 20040).

(3) The storage control unit 20A merges two differential bitmaps P1, S1 to create a new differential bitmap on the side of the storage control unit 20A. Specifically, the storage control unit 20A creates a new bitmap on P1 with a bit having "1" set up for either of the differential bits at the same position of the differential bitmaps P1 and 51 determined as "1" and one having "0" set up for both differential bits determined as "0" (step 20050).

(4) After the new bitmap has been created, the storage control unit 20A refers to the differential bitmap P1 from its beginning and, if the bit has "1" set up, performs a copy processing, and if the bit has "0" set up, does not perform the copy processing and refers to a next bit to perform the copy processing (step 20060).

The copy processing is executed by the same processing as the initial copy described above. The bitmap merged by the above-described processing in the step 20050 may be disposed other than the storage control unit 20A. And, the merge processing may be executed by any unit other than the storage control unit 20A.

According to the above-described Resync method, the Resync processing can be achieved without increasing the differential bitmap volume. According to this method, the management of the link between the storage control units 20A and 20B can also be simplified.

The configurations and operations of the storage systems according to the first to third embodiments of the present invention were described above. Then, the storage system according to a fourth embodiment of the present invention will be described below. In the fourth embodiment of the present invention, the structure in terms of hardware may be the same as in the first to third embodiments of the present invention described above except that two differential bitmaps each are disposed in both of the storage control unit 20A having the original volume and the storage control unit 20B having the copy volume.

Figure 17A:
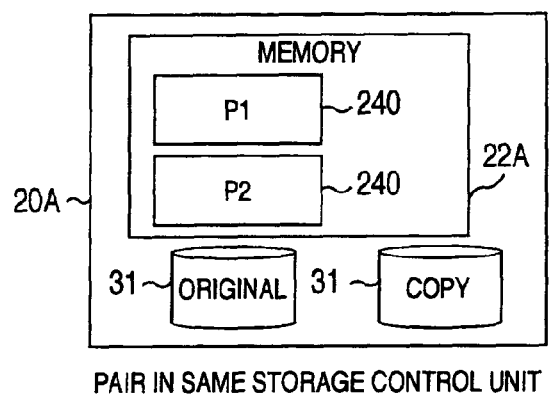
FIGS. 17A and 17B are diagrams showing an example arrangement of differential bitmaps according to a fourth embodiment of the present invention.
Figure 17B:
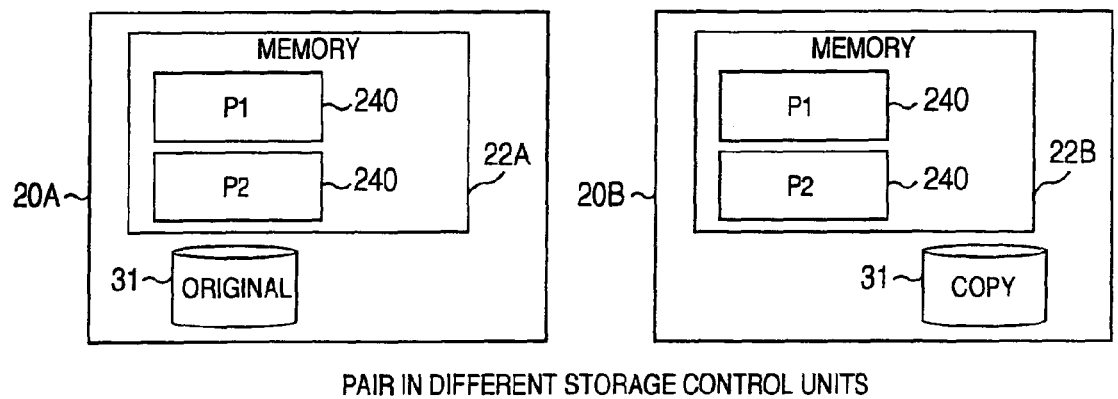

FIG. 17A and FIG. 17B are diagrams showing example arrangements of the differential bitmap according to the fourth embodiment of the present invention.

When replication is to be created in the same storage control unit, the pair of the original and a copy is created in, for example, a storage group 31 to be connected to the storage control unit 20A as shown in FIG. 17A, and a differential bitmap 240 is previously created in two as P1, P2 in the memory 22A of the storage control unit 20A. Where the replication is created in different storage control units, the pair of the original and a copy is created in, for example, the storage group 31 connected to the storage control unit 20A and the storage group 31 connected to the storage control unit 20B as shown in FIG. 17B, and the differential bitmap 240 is created in two as P1, P2 in the memory 22A of the storage control unit 20A and as S1, S2 in the memory 22B of the storage control unit 20B. And, the differential bitmaps P1, S1 are created at the time of the initial copy, and the differential bitmaps P2, S2 are used in the processing after the pair is split.

According to the fourth embodiment of the present invention, the initial copy may be executed by the same processing as that according to the flowcharts described with reference to FIG. 11 and FIG. 12, and the processing in response to a write request during the copy processing may be executed for the pair in the same storage control unit in the same way as the processing according to the flowchart described with reference to FIG. 13.

Figure 18:
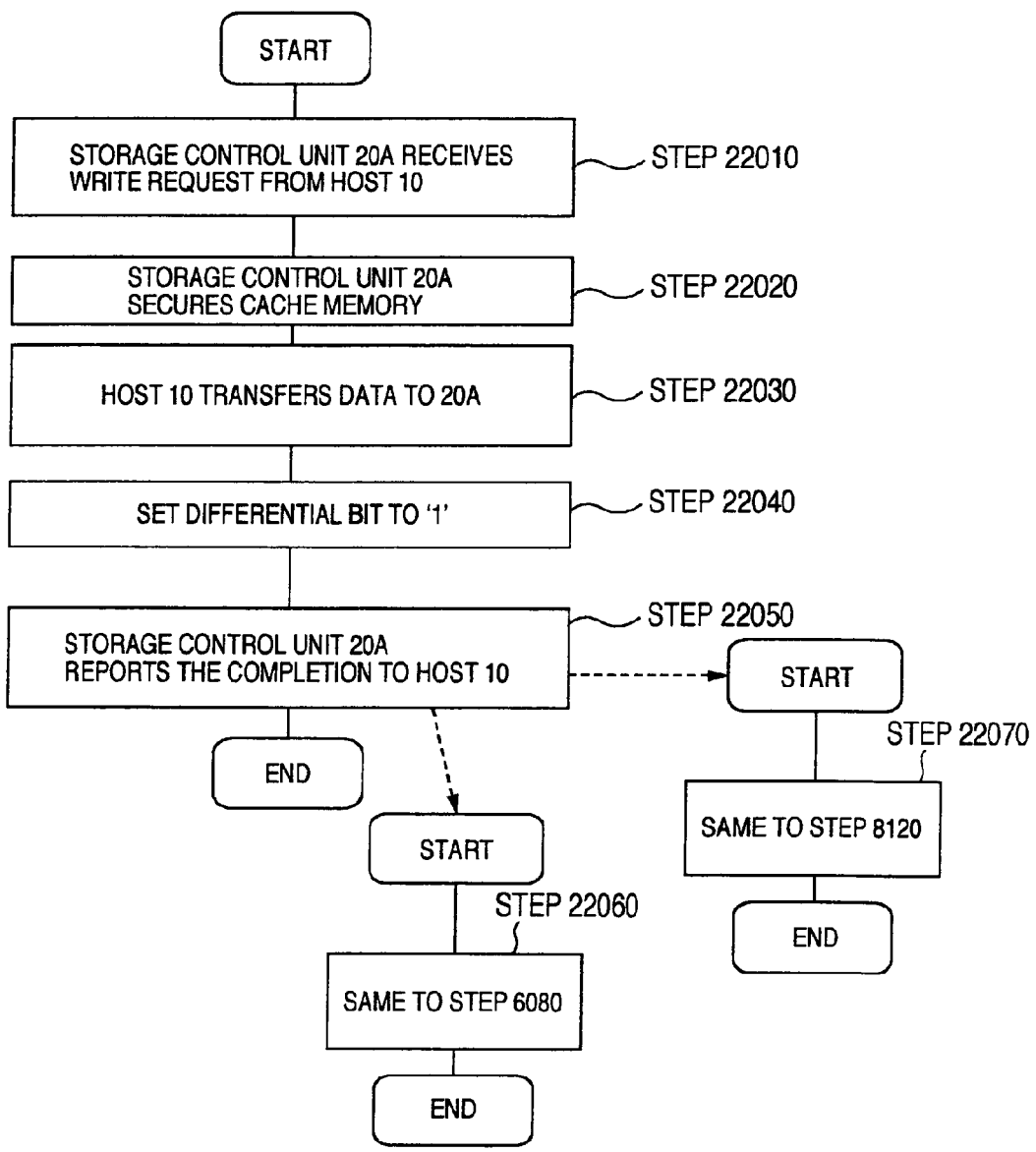
FIG. 18 is a flowchart illustrating an operation of the fourth embodiment when a write request is made during a replication creation processing between different storage control units.

FIG. 18 is a flowchart illustrating an operation according to the fourth embodiment of the present invention when there is a write request during the processing for creation of the replication between different storage control units, and this operation will be described below.

(1) Upon receiving a write request from the host 10 (step 22010), the storage control unit 20A secures a memory region in the cache memory for storage of write data (step 22020), receives the write data being transferred from the host 10 and stores in the memory region secured in the cache memory (step 22030).

(2) A differential bit corresponding to the write data of the differential bitmap P1 is set to "1". When the differential bit has already a value "1", the initial copy to the storage area corresponding to the differential bit has not completed, so that the write data is stored in the cache memory within the storage control unit 20A, and the write data is copied to the copy side at the time of the initial copy processing. When the bit is "0", the differential bit P1 is repeatedly searched to detect the bit "1" and copied to the copy side when the copy processing is executed (step 22040).

(3) Then, the storage control unit 20A reports the completion to the host 10, and the processing here is terminated (step 22050).

(4) The data stored in each cache memory is written (destaged) in the original volume in asynchronization with the above-described processing (step 22060) and written (destaged) in the copy volume (step 22070).

The split is generally executed when the initial copy is terminated and the contents of the original volume and the copy volume are synchronized. On the other hand, there is a technology called "high-speed Split" in that if a Split request is received during the initial copy, the split completion is immediately reported to the host 10, and the remaining copy is performed in the background.

Figure 19:
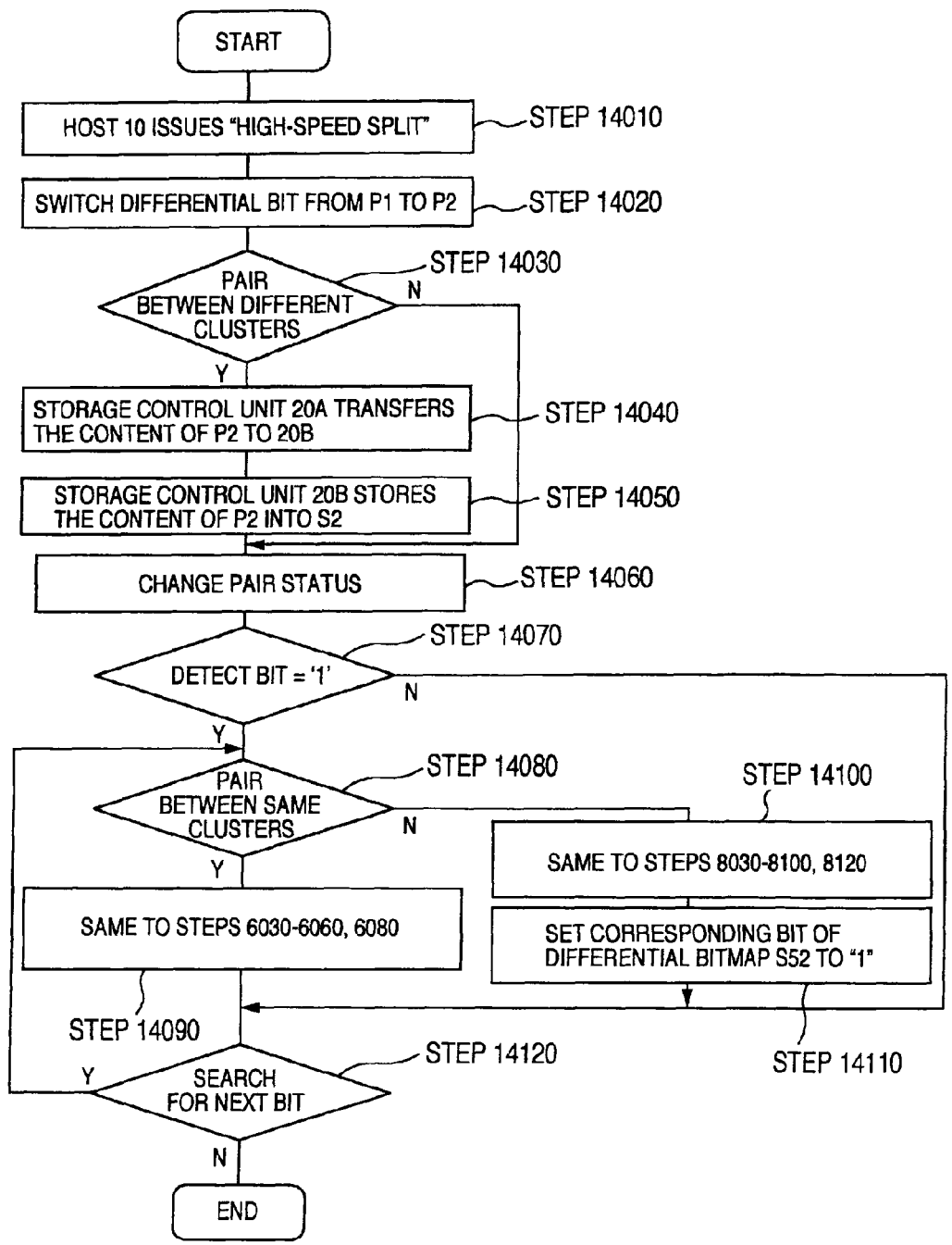
FIG. 19 is a flowchart illustrating a high-speed split processing operation in the fourth embodiment of the present invention.

FIG. 19 is a flowchart illustrating an operation of high-speed split processing according to the fourth embodiment of the present invention, and this operation will be described below.

(1) The host 10 issues "high-speed split" (step 14010), the storage control unit 20A receives it, and the storage control unit 20A switches the differential bitmap 240, which stores a write request location from the host 10, from P1 to P2. In other words, the storage control unit 20A has 1 bit of information indicating which of the bitmaps P1, P2 is used and switches to use alternately the bitmaps P1, P2 (step 14020).

(2) The storage control unit 20A judges whether the pair is a pair between different storage control units (step 14030), and if the pair is a pair between the different storage control units, transfers the differential bitmap P2 to the storage control units 20B (step I4040), and the storage control unit 20B stores the received differential bitmap P2 in the differential bitmap S2 (step 14050).

(3) After the processing in the step 14050, or if the pair was judged not to be a pair between different storage control units in the step I 4030, the storage control unit 20A changes the pair status in the volume pair information table. Thus, the original volume and the copy volume can accept a read/write request. The storage control unit 20 performs the processing of copying dirty data to the copy volume in the background according to the bitmap P2 (step 14060).

(4) For the processing to reflect to the copy volume, the differential bits of the differential bitmap are sequentially referred in order to judge whether bit "1" is detected (step I4070), and if "1" is detected for a differential bit of the differential bitmap, it is judged whether it is a pair in the same storage control unit (step 14080).

(5) If it is judged as the pair in the same storage control unit in the step I4080, the same processing as in the steps 6030 to 6060 and 6080 described with reference to the flow shown in FIG. 11 is performed (step 14090).

(6) If it is judged as the pair between the different storage control units in the step 14080, the same processing as in the steps 8030 to 8100 (a difference in 8100 is P2) and step 8120 described with reference to the flow shown in FIG. 12 is performed (step 14100).

(7) After reporting the completion in the step 8090 during the processing in the step 14100, the corresponding bit of the differential bitmap S2 is also set to "0" (step 14110).

(8) After completing the processing described above, it is judged whether a next differential bit of the differential bitmap is searched or not (step 14120), and if the next differential bit is to be searched, the procedure returns to the processing in the step 14070 and the same processing is repeated. Otherwise, the processing here is terminated.

In the above-described processing operation, the processing in the step 14070 and afterward is a processing for performing the remaining copy in the background (the copy processing having been performed before falling in the split status in order to have the same content between the original and copy volumes).

In the above-described processing, the differential bitmaps P2 and S2 have their contents always matched.

Figure 20:
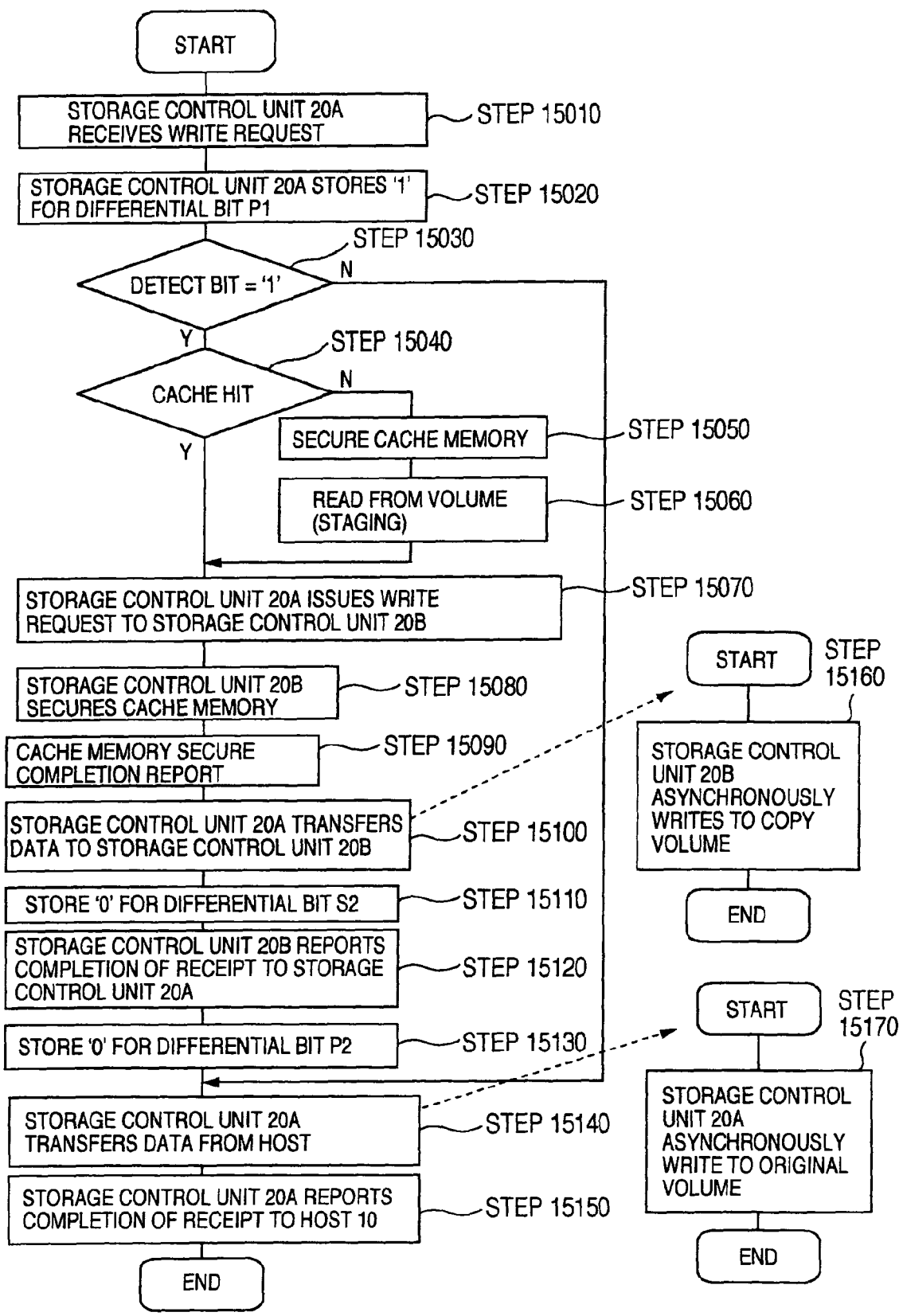
FIG. 20 is a flowchart illustrating an operation of performing write processing to an original volume when falling in a high-speed split status in the fourth embodiment of the present invention.

FIG. 20 is a flowchart illustrating an operation to perform a write processing to the original volume when falling in a high-speed split status according to the fourth embodiment of the present invention, and this operation will be described below.

(1) The storage control unit 20A receives from the host 10 a write request to the original volume (step 15010) and sets a differential bit at a portion corresponding to the write object data of the differential bitmap P1 to "1" (step 15020).

(2) Then, the storage control unit 20A observes a differential bit of a portion corresponding to the write object data of the differential bitmap P2 (namely, a portion corresponding to old data to be updated by write data) to check whether its value is "1" (step 15030). If the value "1" is detected, it indicates that data corresponding to the differential bit has not been copied to the copy volume, so that the storage control unit 20A judges whether the old data to be written is present in the cache memory (step 15040).

(3) If the old data is not in the cache memory when judged in the step 15040, the storage control unit 20A secures a storage area in the cache memory (step 15050), reads the old data to be written from the original volume and performs staging (step 15060).

(4) If the old data is in the cache memory when judged in the step 15040 (a cache hit), or after the staging of the old data to the cache memory by the processing in the step 15060, the storage control unit 20A issues a write request of old data subject to writing to the storage control unit 20B having the copy volume (step 15070).

(5) The storage control unit 20B receives the write request from the storage control unit 20A and secures a cache memory area (step 15080), and the storage control unit 20A receives a cache memory area assurance completion report from the storage control unit 20B (step 15090).

(6) The storage control unit 20A transfers the old data to be written to the storage control unit 20B (step 15100). Meanwhile, the storage control unit 20B stores the transferred data into the cache memory and also sets a differential bit corresponding to the old data to-be-written of the differential bitmap S2 to "0" (step 15110).

(7) The storage control unit 20A receives a write completion report of the old data to-be-written from the storage control unit 20B (step 15120) and sets a differential bit corresponding to the old data to-be-written of the differential bitmap P2 to "0" (step 15130).

(8) After the processing in the step 15130, or if the differential bit "1" is not detected but "0" is detected in the step 15030, the storage control unit 20A receives write data being transferred from the host 10 (step 15140), returns the write completion report to the host 10 and terminates the processing here (step 15150).

(9) The storage control unit 20B stores the data from the storage control unit 20A into the cache memory by the processing in the step 15100 and stores the data into the copy volume in asynchronization with the copy processing from the storage control unit 20A (step 15160).

(10) The storage control unit 20A receives the data from the host 10 by the processing in the step 15140 and stores the data into the original volume in asynchronization with the write request from the host (step 15170).

Figure 21:
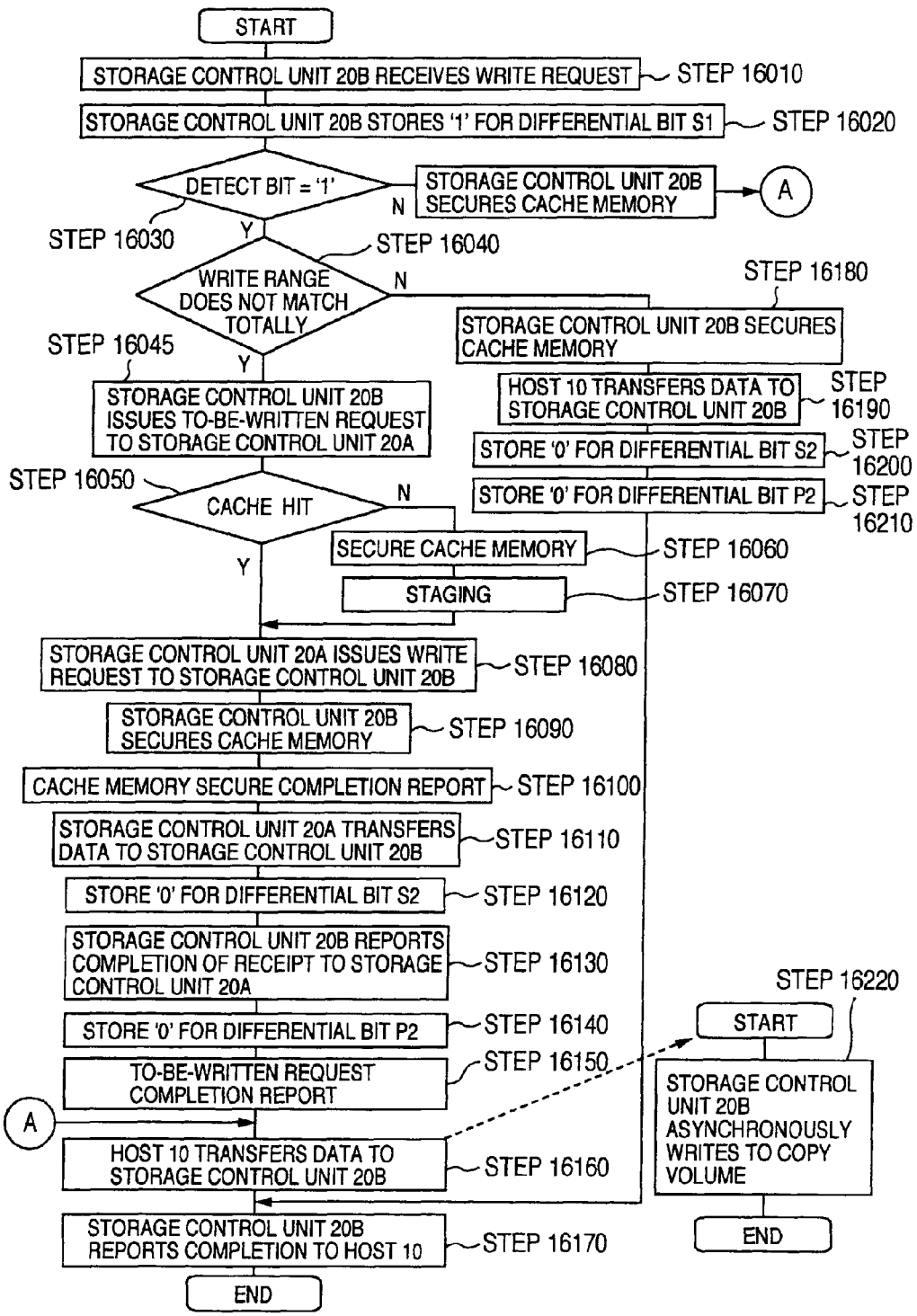
FIG. 21 is a flowchart illustrating an operation of write processing of a copy volume when falling in a high-speed split status in the fourth embodiment of the present invention.

FIG. 21 is a flowchart illustrating an operation to perform write processing to the copy volume when falling in the high-speed split status according to the fourth embodiment of the present invention, and this operation will be described below.

(1) The storage control unit 20B receives a write request to the copy volume from the host 10 (step 16010) and sets the differential bit at a portion corresponding to the data to-be-written of the differential bitmap S1 to "1" (step 16020).

(2) The storage control unit 20B detects whether a differential bit at a portion (namely, a portion corresponding to the old data to be updated by write data) corresponding to the data to-be-written of the differential bitmap S2 is "1" (step 16030), and if it can not be detected that the differential bit is "1", secures a cache memory area (step 16035) and proceeds to step 16160 to be described later.

(3) If the differential bit has "1" set up when detected in the step 16030, it indicates that data corresponding to that bit has not been copied from the original volume to the copy volume, so that the storage control unit 20B judges whether the data to-be-written does not match the whole range of data corresponding to the differential bit (step 16040).

(4) If the data to-be-written matches the whole range of data corresponding to the differential bit when judged in the step 16040, the copying from the original volume is meaningless because all data are rewritten, so that the copying may be omitted. The storage control unit 20B secures a cache memory area (step 16080) and receives data from the host (step 16190).

(5) Then, the storage control unit 20B sets a differential bit corresponding to the old data to-be-written of the differential bitmap P2 to "0" (step 16200), sets the differential bit corresponding to old data to-be-written of the differential bitmap S2 to "0" and proceeds to step 16170 to be described later (step 16210).

(6) If the write range does not fully match in the step 16040, the storage control unit 20B issues a to-be-written request to the storage control unit 20A. The issue of the to-be-written request means that the storage control unit 20B asks the storage control unit 20A to issue a write request to the storage control unit 20B (step 16015).

(7) The storage control unit 20A judges whether the old data to-be-written hits the cache memory (step 16050) and, if it does not hit, secures the cache memory (step 16060) and stages the old data (step 16070).

(8) If the old data to-be-written hits the cache memory of the storage control unit 20A when judged in the step 16050, or after the old data is staged by the processing in the step 1670, the storage control unit 20A issues an old data write request to the storage control unit 20B (step 16080).

(9) The storage control unit 20B secures a cache memory area (step 16090) and, if secured, reports the cache memory assurance completion to the storage control unit 20A (step 16100).

(10) The storage control unit 20A transfers the old data to the storage control unit 20B (step 16110), the storage control unit 20B sets a corresponding bit of the differential bitmap S2 to "0" (step 16120) and reports the completion to the storage control unit 20A (step 16130).

(11) The storage control unit 20A which has transferred the old data sets the differential bitmap P2 to "0" (step 16140) and reports the completion of the to-be-written request to the storage control unit 20B (step 16150).

(12) The storage control unit 20B receives write data from the host 10 (step 16160), sends a completion report to the host 10 and terminates the processing here (step 16170).

(13) The storage control unit 20B having received the write data from the host 10 by the processing in the step 16160 stores the data into the copy volume asynchronously (step 16220).

The processing in response to the write request to the copy volume was described above. In a case of a read request to the copy volume, the storage control unit 20B receives old data from the storage control unit 20A and transfers to the host 10 in the same way as above.

The processing at a time when the original volume receives a write request to an unreflected region to the copy volume from the host 10 when falling in the above-described high-speed split status is called the "previous copy processing", and the processing at a time when the copy volume receives from the host 10 a read/write request to an uncopied region from the original volume is called the "prefetch copy processing".

The fourth embodiment of the present invention realizes the prefetch copy processing, as a form of the to-be-written request from the copy volume to the original volume as described with reference to the flow of FIG. 21, so that a deadlock involved in the cache memory area assurance within the opposite-side storage control unit between the prefetch copy processing and the previous copy processing can be prevented. In other words, the processing among the high-speed Split, the previous copy and the prefetch copy can be performed by the processing having secured the lock of the data to-be-copied, and it becomes possible to perform exclusion control.

After the high-speed Split, the differential bitmap is switched from P1 to P2, the bitmap P2 is used to continue copying in the background, but the bitmap P2 is not used for the update of data, and it is made not to turn ON the bit of the bitmap P2. And, the opportunity to turn OFF the bit of the differential bitmap P1 is determined to be after the background copy, previous copy and prefetch copy complete copying the data to-be-copied from the original volume to the copy volume. Thus, a case that the bit of the differential bitmap P1 is unfavorably turned OFF can be excluded. And, the differential bitmap S2 can set all bits to "1" (ON) before the split so to exclude a case "the bit of the differential bitmap S2 is OFF, but the bit of the differential bitmap P2 is ON". A region where the differential bitmap P2 has not been copied to the differential bitmap S2 is judged to be necessary to perform a prefetch copy with reference to the differential bitmap S2, and the "to-be-written request" is performed, but when the differential bitmap P2 is referred to, there is a case that the copy is actually not necessary. In such a case, the bit of the differential bitmap S2 is turned OFF, and the request of the copy volume may be performed.

Besides, the storage control unit 20A determines a frequency of sending depending on a response time for the cache memory assurance from the storage control unit 20B and performs sending. It is because the processing is in series from the storage control unit 20A to the storage control unit 20B, so that it is necessary to limit a flow rate of processing.

The Resync processing in the fourth embodiment of the present invention can be performed in the same way as those in the first to third embodiments of the present invention.

Figure 22:
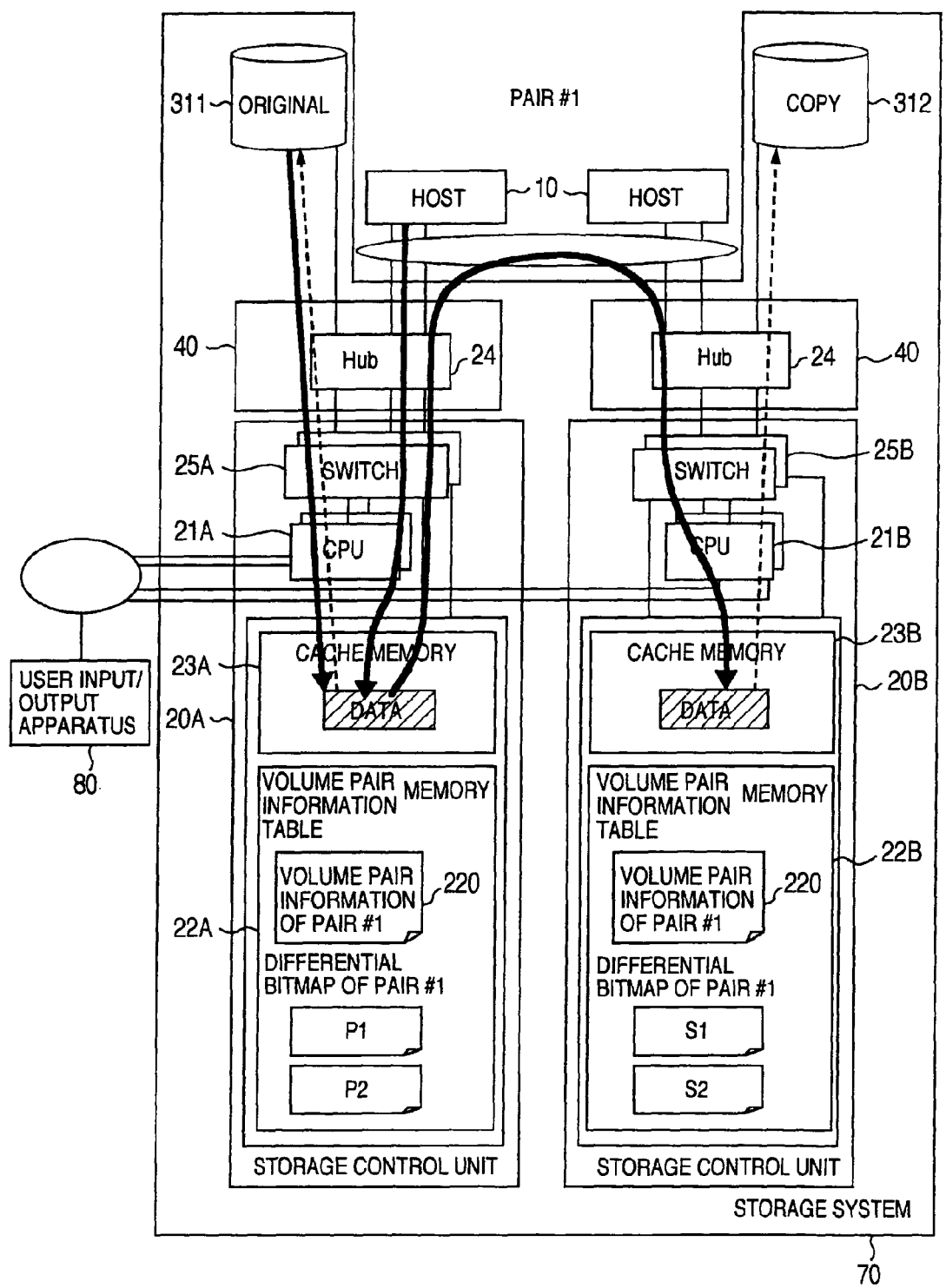
FIG. 22 is a diagram showing a data transfer path when a write request is made during the replication creation processing between different storage control units in the forth embodiment of the present invention.

FIG. 22 is a diagram showing a data transfer path in case of a write request during the replication creation processing between different storage control units according to the fourth embodiment of the present invention. FIG. 22 also shows an arrangement of the differential bitmap.

It is seen from the data transfer path shown in FIG. 22 that, if there is a write request during the replication creation processing between the different storage control units, the reflection of the update to the copy volume when the write request is received can be performed on an extension of the same I/O processing in the same way as in the above-described first to third embodiments of the present invention. The write request for update to the copy volume in this case is sent from CPU 21A to CPU 21B through the same route as the data transmission line, and the differential bitmap at the time of merging of the differential bitmap is also sent through the same route as the data transmission line.

Figure 23:
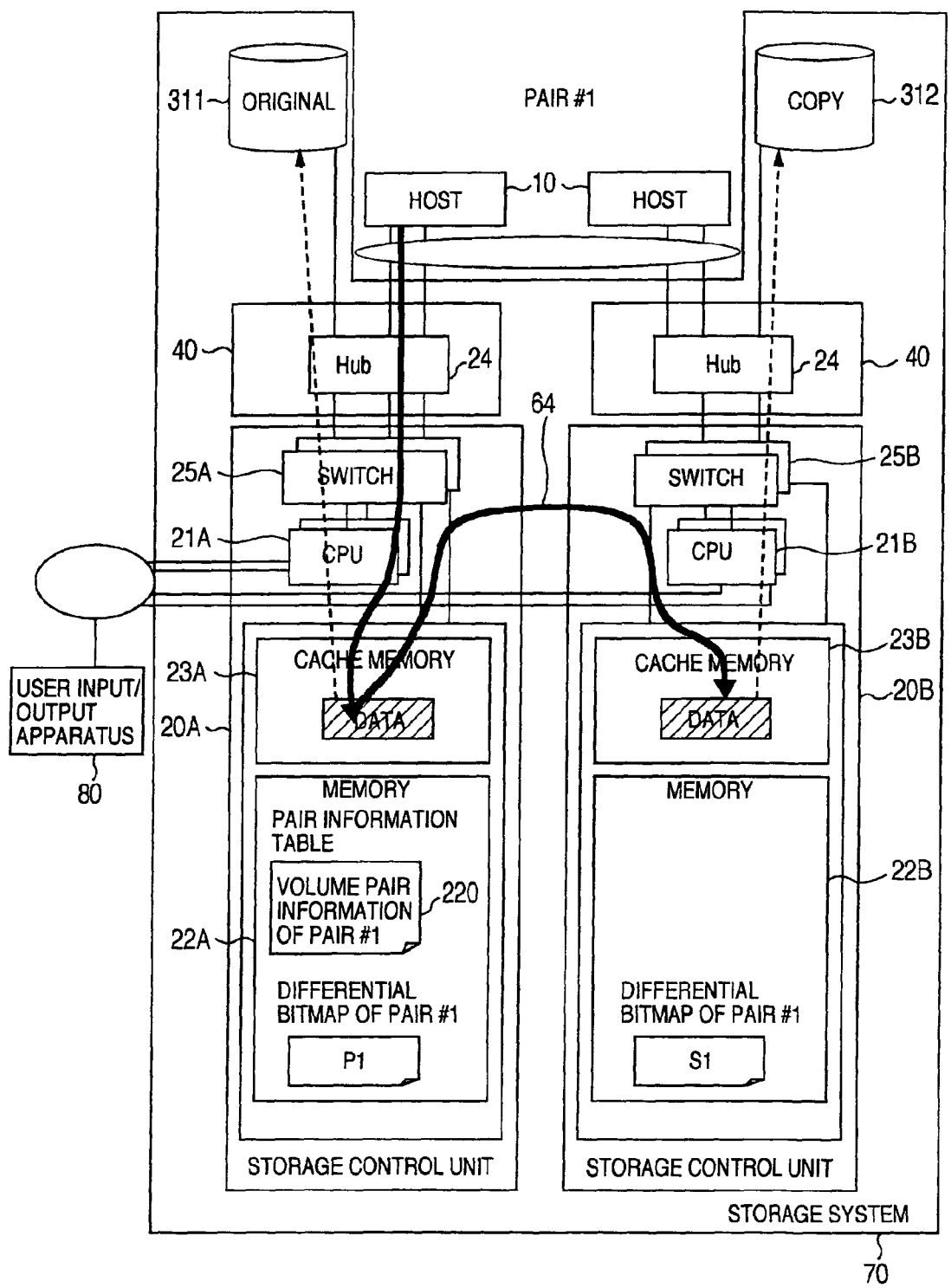
FIG. 23 is a diagram showing a data transfer path when a write request is made during the replication creation processing between different storage control units in the second embodiment of the present invention shown in FIG. 2.
Figure 24:
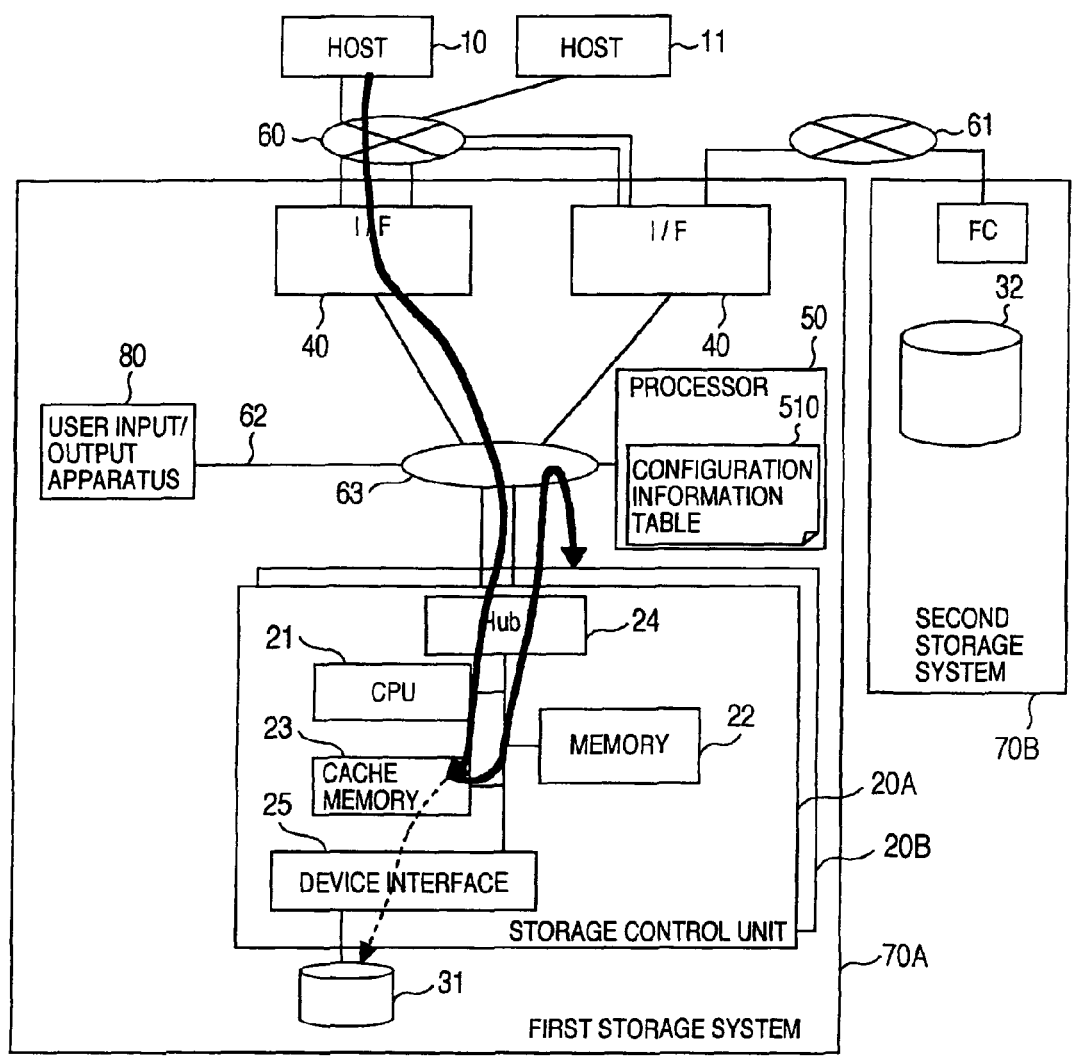
FIG. 24 is a diagram showing a data transfer path when a write request is made during the replication creation processing between different storage control units in the third embodiment of the present invention shown in FIG. 3.

FIG. 23 is a diagram showing a data transfer path in case of a write request during the replication creation processing between different storage control units in the second embodiment of the present invention shown in FIG. 2, and FIG. 24 is a diagram showing a data transfer path in case of a write request during the replication creation processing between different storage control units in the third embodiment of the present invention shown in FIG. 3.

The data transfer paths shown in FIG. 23 and FIG. 24 are different form that shown in FIG. 15 because the hardware has a different structure, but the other portions are not different from those in FIG. 15, and the write request for update to the copy volume is sent from the CPU 21A to the CPU 21B through the same route as the data transmission line. When the above-described fourth embodiment of the present invention is applied to the embodiments of the present invention shown in FIG. 2 and FIG. 3, the write request for update to the copy volume is sent from the CPU 21A to the CPU 21B through the same route as the data transmission line in the same way as described with reference to FIG. 22. And, the differential bitmap at the time of merging the differential bitmap is also sent through the same route as the data transmission line.

According to the first to fourth embodiments of the present invention described above, when replication is to be created in the volume within the disk devices connected to different control units in the storage system having the plural storage control units to which the plural disk devices are connected, a copy of the storage area can be created without degrading the performance by minimizing the access of control information between the control units. And, where a pair is divided, the control units are physically divided, and the I/O of the other control unit does not affect, so that the storage area can be copied without degrading the performance.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A storage system coupled to a host computer through a network, the storage system comprising:
   a first interface adapter coupled to a host computer through the network;
   a plurality of first disk devices including a first volume;
   a first control unit coupled to the first interface adapter and the first disk devices, the first control unit including a first processor and a first switch;
   a second interface adapter coupled to the host computer through the network;
   a plurality of second disk devices including a second volume;
   a second control unit coupled to the second interface adapter, the second control unit including a second processor and a second switch and a memory storing data sent from the host computer to the second volume temporarily; and a connection line connected to the first switch of the first control unit and the second switch of the second control unit, wherein the first control unit controls Input/Output (I/O) requests to the first volume, and the second control unit controls I/O requests to the second volume, wherein when data stored in the first volume is copied to the second volume, the first control unit reads data stored in the first volume, and sends a write request regarding the data stored in the first volume to the second storage system through the first switch, the connection line and the second switch, the second control unit secures a region for data of the write request in the memory of the second control unit, and the first control unit transfers the data of the write request through the first switch, the connection line and the second switch to the secured region in the memory of the second control unit, and the second control unit writes the data stored in the memory in the second volume, wherein, if the first control unit receives a write request from the host computer while data copy is performed from the first volume to the second volume through the first switch, then the connection line and the second switch, the first control unit determines whether a target area of the write request is copied or not, wherein, if the target area of the write request has been already copied, then the first control unit sends the write request to the second control unit through the first switch, the connection line and the second switch, and the first and second control units respectively write data of the write request to the first and second volumes, and wherein, if the target area of the write request has not been copied yet, then the data of the write request is written to the first volume.

2. A storage system according to claim 1, wherein the network is an external network of the storage system and the connection line is an internal network of the storage system.

3. A storage system according to claim 2, wherein the data copy is performed by a predetermined data size and whether the data is copied or not is managed in a unit of a predetermined data size, and wherein, if a target area of the write request has not been copied yet, then the second control unit compares the target area of the write request with a not copied area managed in the unit of the predetermined data size, and the second control unit does not issue a to-be written request if the target area in the write request coincides with the not copied area.

4. A storage system according to claim 1, wherein the second control unit operating as a copy destination control unit reports completion of data receipt to the first control unit operating as a copy source control unit.

5. A storage system according to claim 1, wherein a data write process in the second control unit at the copy destination side is performed asynchronously with the data transfer process between the first and second control units.

6. A storage system according to claim 1, wherein a data transmission route through the first switch, the connection line and the second switch is the same as a path for sending the write request when the data copy is performed.

7. A storage system according to claim 1, wherein the memory of the first control unit stores copy pair information of the first and second control units.

8. A storage system coupled to a host computer through a network, the storage system comprising:

a first interface adapter coupled to a host computer through the network;

a plurality of first disk devices including a first volume;

a first control unit coupled to the first interface adapter and the first disk devices, the first control unit including a first processor and a first switch;

a second interface adapter coupled to the host computer through the network;

a plurality of second disk devices including a second volume; and a second control unit coupled to the second interface adapter, the second control unit including a second processor, a second switch and a memory, wherein the first control unit controls Input/Output (I/O) requests to the first volume, and the second control unit controls I/O requests to the second volume, wherein when a data stored in the first volume is copied to the second volume, the first control unit reads data stored in the first volume, and sends a write request regarding the data stored in the first volume to the second storage system through the first interface adapter, the network, and the second interface adapter, the second control unit secures a region for data of the write request in the memory of the second control unit, wherein the first control unit transfers the data of the write request through the first interface adapter, the network, and the second interface adapter to the secured region in the memory of the second control unit, and the second control unit writes the data stored in the memory in the second volume, wherein, if the first control unit receives a write request from the host computer while data copy is performed from the first volume to the second volume through the first interface adapter, the network, and the second interface adapter, then the first storage control unit determines whether a target area of the write request is copied or not, wherein, if the target area of the write request has been already copied, then the first control unit sends the write request to the second control unit through the first interface adapter, the network, and the second interface adapter, and the first and second control units respectively write data of the write request to the first and second volumes, and wherein, if the target area of the write request has not been copied yet, then the data of the write request is written to the first volume.

9. A storage system according to claim 8, wherein the network is an external network of the storage system.

10. A storage system according to claim 8, wherein the second control unit operating as a copy destination control unit reports completion of data receipt to the first control unit operating as a copy source control unit.

11. A storage system according to claim 8, wherein a data write process in the second control unit at the copy destination side is performed asynchronously with the data transfer process between the first and second control units.

12. A storage system according to claim 8, wherein a data transmission route through the first interface adapter, the network, and the second interface adapter is the same as a path for sending the write request when the data copy is performed.

13. A storage system according to claim 8, wherein the data copy is performed by a predetermined data size and whether the data is copied or not is managed in a unit of a predetermined data size, and wherein, if the target area of the write request has not been copied yet, then the second control unit compares the target area of the write request with a not copied area managed in the unit of the predetermined data size, and the second storage control unit does not issue a to-be written request if the target area in the write request coincides with the not copied area.

14. A storage system according to claim 8, wherein the memory of the first control unit stores copy pair information of the first and second control units.

* * * * *